(12) United States Patent
May et al.

(10) Patent No.: US 7,597,942 B2
(45) Date of Patent: Oct. 6, 2009

(54) POLYMERISABLE LIQUID CRYSTAL MATERIAL

(75) Inventors: Alison Linda May, Poole (GB); Peter (Fangyun) Hsu, Wiesbaden-Sonnenberg (DE); Tara Perrett, Bournemouth (GB); Ashley Nathan Smith, Southampton (GB); Owain Llyr Parri, Ringwood (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/661,832

(22) PCT Filed: Aug. 10, 2005

(86) PCT No.: PCT/EP2005/008676

§ 371 (c)(1),
(2), (4) Date: Oct. 9, 2007

(87) PCT Pub. No.: WO2006/027076

PCT Pub. Date: Mar. 16, 2006

(65) Prior Publication Data

US 2008/0143943 A1    Jun. 19, 2008

(30) Foreign Application Priority Data

Sep. 6, 2004    (EP) .................................. 04021104

(51) Int. Cl.
| C09K 19/38 | (2006.01) |
|---|---|
| C09K 19/52 | (2006.01) |
| C09K 19/54 | (2006.01) |
| C09K 19/58 | (2006.01) |
| C09K 19/60 | (2006.01) |
| C09K 19/20 | (2006.01) |
| C09K 19/12 | (2006.01) |
| C07C 69/76 | (2006.01) |
| G02F 1/13363 | (2006.01) |

(52) U.S. Cl. ................ 428/1.1; 252/299.01; 252/299.1; 252/299.5; 252/299.66; 252/299.67; 349/117; 560/62; 560/65

(58) Field of Classification Search ............ 252/299.01, 252/299.1, 299.5, 299.66, 299.67; 428/1.1, 428/1.3; 349/117; 560/62, 65
See application file for complete search history.

(56) References Cited

U.S. PATENT DOCUMENTS

| 5,871,665 | A | 2/1999 | Coates et al. |
|---|---|---|---|
| 6,491,990 | B1 | 12/2002 | Parri et al. |
| 6,514,578 | B1 | 2/2003 | Farrand |
| 6,805,920 | B2 | 10/2004 | Nakano et al. |
| 2003/0072893 | A1 | 4/2003 | Nakano et al. |
| 2004/0051831 | A1* | 3/2004 | Su Yu et al. .................. 349/117 |
| 2004/0135119 | A1 | 7/2004 | Taugerbeck et al. |
| 2005/0219447 | A1* | 10/2005 | Slaney et al. ................. 349/117 |
| 2006/0119783 | A1 | 6/2006 | Fukuoka et al. |
| 2006/0127605 | A1 | 6/2006 | Takeda et al. |

FOREIGN PATENT DOCUMENTS

| EP | 1388538 A | 2/2004 |
|---|---|---|
| GB | 2388599 A | 11/2003 |
| GB | 2395201 | * 5/2004 |
| JP | 2000-281628 | * 10/2000 |
| JP | 2002-265421 A2 | 9/2002 |
| JP | 2002-308832 A2 | 10/2002 |
| WO | WO 93/22397 A | 11/1993 |
| WO | WO 02/094805 A | 11/2002 |
| WO | WO 03/054111 A1 | 7/2003 |
| WO | WO 2004/063778 A1 | 7/2004 |
| WO | WO 2004/063779 A1 | 7/2004 |
| WO | WO 2004/063780 A1 | 7/2004 |

OTHER PUBLICATIONS

English translation by computer for JP-2000281628, http://www4.ipdl.inpit.go.jp/Tokujitu/PAJdetail.ipdl?N0000=60&N0120=01&N2001=2&N3001=2000-281628.*

* cited by examiner

*Primary Examiner*—Shean C Wu
(74) *Attorney, Agent, or Firm*—Millen, White, Zelano, Branigan, P.C.

(57) ABSTRACT

The invention relates to a polymerisable liquid crystal (LC) material, to optically biaxial films prepared thereof, to novel polymerisable compounds used therein and to the use of the material and films in optical devices like compensators and LC displays (LCDs).

27 Claims, 14 Drawing Sheets

POLYMERISABLE LIQUID CRYSTAL MATERIAL

FIELD OF INVENTION

The invention relates to a polymerisable liquid crystal (LC) material, to optically biaxial films prepared thereof, to novel polymerisable compounds used therein and to the use of the material and films in optical devices like compensators and LC displays (LCDs).

BACKGROUND AND PRIOR ART

Biaxial negative C-plate retarders are suitable for use as compensators in LCDs to improve the optical parameters such as contrast ratio and grey scale representation at large viewing angles. A biaxial negative C-plate retarder in its optical properties approximates to a combination of a planar A-plate and a negative C-plate, but shows better optical performance than such a combination. The in-plane anisotropy of the biaxial negative C-plate retarder ($\Delta n_{xy}$) approximates to the A-plate and the out-of-plane anisotropy ($\Delta n_{xz}$ and $\Delta n_{yz}$) to the negative C-plate. Simulations have shown that the optical performance of the biaxial negative C-plate retarder is superior to that of the A-plate and negative C-plate stacked sequentially, and shows exceptionally good viewing-angle performance for LCDs. Furthermore, the use of a single biaxial film instead of two stacked films reduces costs and manufacturing problems.

WO 03/01544 discloses a biaxial negative C-plate comprising a cholesteric film having a deformed helix structure with an elliptical refractive index. It also discloses a method of preparing such a film from a polymerisable cholesteric LC material comprising a dichroic UV-photoinitiator. The cholesteric material is applied onto a substrate and irradiated with linear polarised UV light. The use of a dichroic UV-photoinitiator in combination linear polarised UV light induces a deformed helix structure in the LC material which is then fixed by in-situ polymerisation. As a consequence the resulting polymer film exhibits an elliptical refractive index and optical biaxiality.

However, the films disclosed in prior art do only have a limited biaxiality. To increase the biaxiality of the films new materials and methods are required.

It was an aim of the present invention to provide new materials and methods for preparing biaxial negative C-plate retarders with improved properties, in particular with a higher biaxiality index. Another aim of the present invention was to extend the pool of materials for preparing biaxial films available to the expert. Other aims of the present invention are immediately evident to the person skilled in the art from the following detailed description.

It was found that these aims can be achieved by providing materials and methods as claimed in the present invention.

DEFINITION OF TERMS

The term 'film' includes rigid or flexible, self-supporting or free-standing films with mechanical stability, as well as coatings or layers on a supporting substrate or between two substrates.

The term 'liquid crystal or mesogenic material' or 'liquid crystal or mesogenic compound' means materials or compounds comprising one or more rod-shaped, board-shaped or disk-shaped mesogenic groups, i.e. groups with the ability to induce liquid crystal (LC) phase behaviour. LC compounds with rod-shaped or board-shaped groups are also known in the art as 'calamitic' liquid crystals. LC compounds with a disk-shaped group are also known in the art as 'discotic' liquid crystals. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised.

For the sake of simplicity, the term 'liquid crystal material' is used hereinafter for both mesogenic and LC materials.

Polymerisable compounds with one polymerisable group are also referred to as 'monoreactive' compounds, compounds with two polymerisable groups as 'direactive' compounds, and compounds with more than two polymerisable groups as 'multireactive' compounds. Compounds without a polymerisable group are also referred to as 'non-reactive' compounds.

The term 'reactive mesogen' (RM) means a polymerisable mesogenic or liquid crystal compound.

The term 'director' is known in the art and means the preferred orientation direction of the long molecular axes (in case of calamitic compounds) or short molecular axis (in case of discotic compounds) of the mesogenic groups in an LC material.

In films comprising uniaxially positive birefringent LC material the optical axis is given by the director.

The degree of biaxiality in an optical film or layer can be expressed by the biaxiality index $BI=R_0/R_{th}$, wherein $$R_0 = d \cdot (n_x - n_y), \text{ and}$$

$$R_{th} = d \cdot [(n_x + n_y)/2 - n_z]$$

wherein d is the film thickness, $n_x$ and $n_y$ are the principal refractive indices in orthogonal directions within the film plane and $n_z$ is the principal refractive index in a direction perpendicular to the film plane.

SUMMARY OF THE INVENTION

The invention relates to a polymerisable LC material comprising
A) at least one polymerisable mesogenic compound having high birefringence of 0.15 or higher, preferably 0.20 or higher and preferably selected of formula I

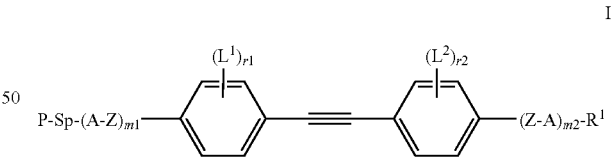

wherein
P is a polymerisable group,
Sp is a spacer group or a single bond,
A is in case of multiple occurrence independently of one another an aromatic or aliphatic 5- or 6-ring, or a group comprising two or three fused aromatic or aliphatic 5- or 6-rings, these rings optionally containing one or more hetero atoms selected from N, O and S, and optionally being substituted by one or more identical or different groups $L^1$,
Z is in case of multiple occurrence independently of one another —O—, —S—, —CO—, —COO—, —OCO—, —S—CO—, —CO—S—, —O—CO—O—, —CO—NR⁰—, —NR⁰—CO—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=CR⁰—, —CH=CH—, —CH=CF—, —CY¹=CY¹—, —C≡C—, —CH=CH— COO—, —OCO— CH=CH— or a single bond, R⁰ and R⁰⁰ are independently of each other H or alkyl with 1 to 12 C-atoms, Y¹ and Y² are independently of each other H, F, Cl or CN, m1, m2 are independently of each other 0, 1 or 2, with m1+m2 ≦3, L¹, L² are independently of each other F, Cl, Br, I, CN, NO₂, P-Sp- or alkyl, alkoxy, alkylcarbonyl, alkoxycarbonyl, alkylcarbonlyoxy or alkoxycarbonyloxy with 1 to 12 C atoms, wherein one or more H atoms are optionally replaced by F or Cl, r1, r2 are independently of each other 0, 1, 2, 3 or 4, R¹ is H, halogen, CN, NCS, SF₅, P-Sp- or straight chain or branched alkyl with 1 to 20 C-atoms that is optionally mono- or polysubstituted by F, Cl, Br, I or CN, and wherein one or more non-adjacent CH₂-groups are optionally replaced, in each case independently from one another, by —O—, —S—, —NR⁰—, —SiR⁰R⁰⁰—, —CO—, —COO—, —OCO—, —OCO—O—, —NR⁰—CO—, —CO—NR⁰—, —NR⁰—CO—NR⁰—, —S—CO—, —CO—S—, —CY¹=CY²— or —C≡C— in such a manner that O and/or S atoms are not linked directly to one another, B) at least one polymerisable mesogenic compound having two or more polymerisable groups, C) at least one chiral compound, preferably having a high helical twisting power (HTP) of at least 40 μm⁻¹, very preferably at least 60 μm⁻¹, D) optionally at least one monoreactive polymerisable compound having a liquid crystal phase, preferably an enantiotropic nematic phase, and a high clearing point, preferably of 75° C. or higher, E) at least one dichroic photoinitiator.

The invention further relates to an optically biaxial film obtainable from a polymerisable LC material as described above and below.

The invention further relates to the use of a biaxial film as described above and below as retardation or compensation film in optical devices like for example LCDs.

The invention further relates to a compensator comprising a biaxial film as described above and below.

The invention further relates to an LCD comprising a compensator or biaxial film as described above and below.

BRIEF DESCRIPTION OF THE DRAWINGS

FIGS. 3A-15A show the retardation profile of biaxial films according to examples 6-18 of the present invention.

FIGS. 3B-15B show the biaxiality index vs. curing temperature of biaxial films according to examples 6-18 of the present invention.

DETAILED DESCRIPTION OF THE INVENTION

Figure 1:
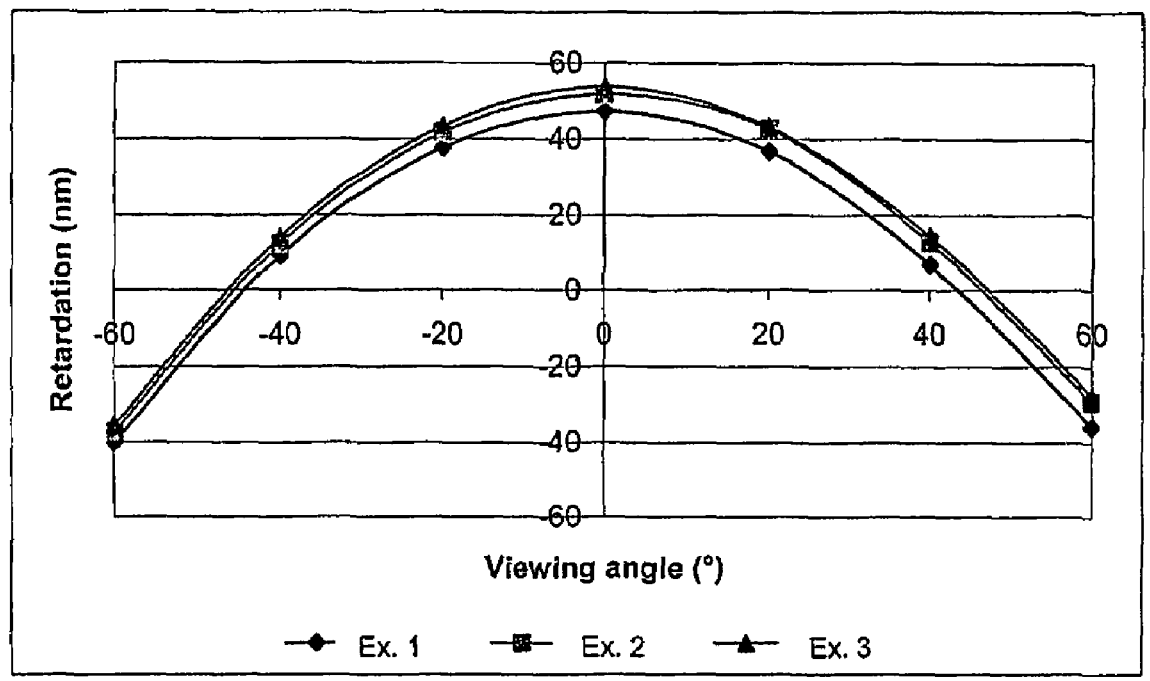
FIG. 1 shows the retardation profile (retardation vs. viewing angle) of biaxial films according to examples 1, 2 and 3 of the present invention.

Especially preferred compounds of formula I are those wherein
m1 is 1,
m2 is 0,

R¹ is selected from Cl or optionally mono- or polyfluorinated straight-chain or branched alkyl with 1 to 12 C-atoms, preferably 1 to 6 C-atoms wherein one or two non-adjacent CH₂-groups are optionally replaced by —O—, —S—, —CO—, —COO—, —OCO—, —OCO—O—, —S—CO— or —CO—S— in such a manner that O and/or S atoms are not linked directly to one another, very preferably optionally mono- or polyfluorinated straight-chain or branched alkyl Cl, alkyl, alkoxy or alkylsulfanyl (—S-alkyl) with 1 to 6 C-atoms, A is 1,4-cyclohexylene or 1,4-phenylene that is optionally substituted with 1 to 4 groups L¹, r1 is 0, 1 or 2,
r2 is 0, 1 or 2,
r1+r2 is 1 or 2,
Z is —COO—, —OCO— or a single bond.

Very preferred are compounds of formula Ia

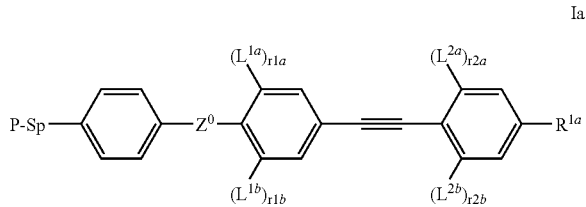

Ia wherein P and Sp are as defined in formula I,

Z⁰ is —COO—, —OCO— or a single bond, preferably —COO—,

L^{1a,1b,2a,2b} are independently of each other F, Cl, CN, (O)ₐC_bF_cH_{2b+1-c} or COCH₃, preferably Cl, CH₃ or OCH₃, r1a, r1b, r2a, r2b are independently of each other 0 or 1, with at least one of r1a, r1b, r2a, r2b being 1, R^{1a} is Cl or optionally mono- or polyfluorinated straight-chain or branched alkyl with 1 to 6 C-atoms wherein one or two non-adjacent CH₂-groups are optionally replaced by —O—, —S—, —CO—, —COO—, —OCO—, —OCO—O—, —S—CO— or —CO—S— in such a manner that O and/or S atoms are not linked directly to one another, a is 0 or 1,
b is 1 or 2,
c is 0, 1, 2, 3, 4 or 5.

Especially preferred are compounds of formula Ia wherein
r1a and r1b are 1,
r1b is 0,
r2b is 0,
r2a and r2b are 0,
r1a is 1 and r1b is 0,
r2a is 1 and r2b is 0, R^{1a} is Cl or optionally mono- or polyfluorinated alkyl, alkoxy or alkylsulfanyl (—S-alkyl) with 1 to 6 C-atoms, very preferably Cl, CH₃, C₂H₅, OCH₃, OC₂H₅, SCH₃, SC₂H₅, OCF₃, OCHF₂, OCH₂F or OC₂F₅, most preferably Cl, CH₃, C₂H₅, OCH₃ or SCH₃.

The compounds of formula Ia are novel and are another aspect of the invention.

A further aspect of the invention relates to the use of novel compounds of formula Ia in optical and electrooptical components or devices, in particular optical films, polarisers, compensators, beam splitters, reflective films, alignment layers, colour filters, holographic elements, hot stamping foils, coloured images, decorative or security markings, liquid crystal pigments, adhesives, synthetic resins with anisotropic mechanical properties, cosmetics, diagnostics, nonlinear optics, optical information storage or in LC media for LC display devices, preferably for use in polymerisable LC materials and for the preparation of optically biaxial films.

The novel compounds of formula Ia can be prepared in analogy to the methods described in U.S. Pat. No. 6,514,578 or GB 2 388 599 A in particular according to or in analogy to schemes 1 and 2 below, wherein L has one of the meanings of $L^{1a}$ given above, r is 0, 1 or 2, and R has one of the meanings of $R^{1a}$ given above.

Scheme 1:

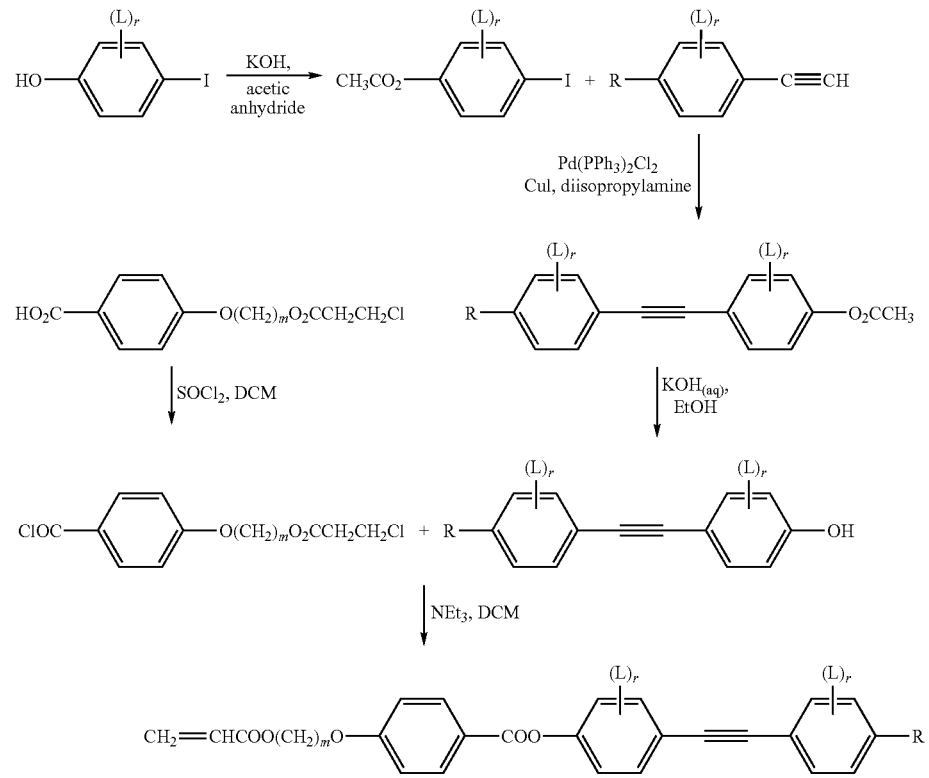

Scheme 2:

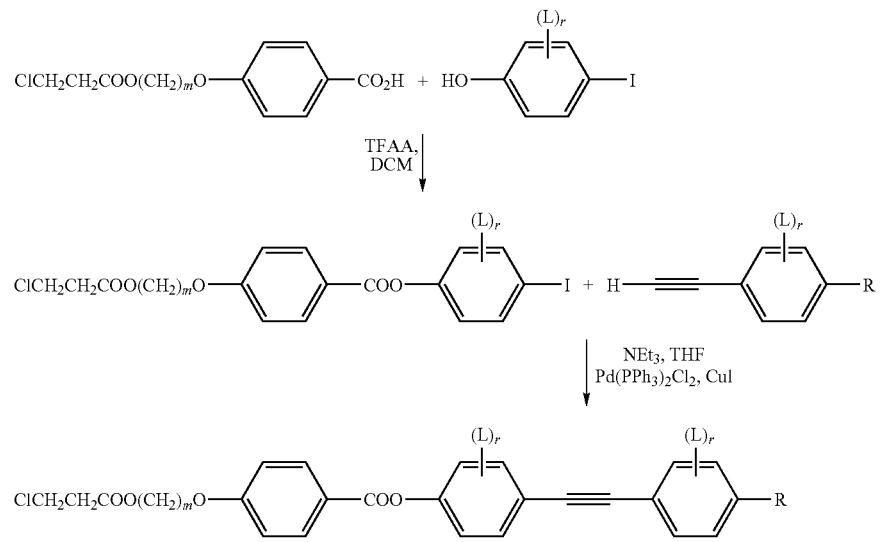

Component B) preferably comprises one or more direactive compounds of formula II

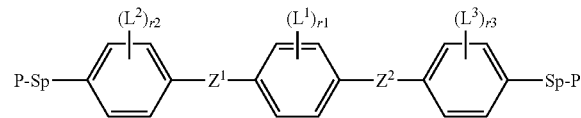

II wherein P, Sp, $L^1$, $L^2$, r1 and r2 have independently of each other the meanings of formula I, $Z^1$ and $Z^2$ have one of the meanings given for Z in formula I, $L^3$ has one of the meanings of $L^1$ and r3 has one of the meanings of r1.

Especially preferred are compounds of formula II wherein $Z^1$ and $Z^2$ are —$CH_2CH_2$—, —COO—, —OCO— or a single bond, in particular wherein $Z^1$ is —COO— and $Z^2$ is —OCO—. Further preferred are compounds of formula II wherein r2 and r3 are 0, r1 is 0, 1 or 2 and $L^1$ is F, Cl, $CH_3$, $C_2H_5$, $OCH_3$ or $COCH_3$.

The chiral compounds of component C) can be selected from, optionally polymerisable, chiral dopants which are known from prior art, like for example the commercially available R- or S-811, R- or S-1011, R- or S-2011, R- or S-3011, R- or S-4011, R- or S-5011, or CB 15 (from Merck KGaA, Darmstadt, Germany).

Especially preferred are chiral compounds having a high value of the helical twisting power (HTP), in particular with a HTP of at least 40 μm$^{-1}$, very preferably of at least 60 μm$^{-1}$, for example from 60 to 110 μm$^{-1}$.

Very preferred are chiral compounds with a high HTP as disclosed in WO 98/00428 (sorbitols), GB 2,328,207 (hydrobenzoins), WO 02/94805 (binaphthols), WO 02/34739 (binaphthols), WO 02/06265 (TADDOLs), WO 02/06196 or WO 02/06195 (compounds with $CF_2O$-groups, in particular binaphthols).

Especially preferred are chiral binaphthols as disclosed in WO 02/34739 and WO 02/94805. Very preferred are compounds of formula III

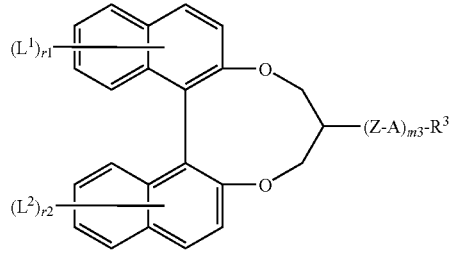

III wherein $R^3$ has one of the meanings of $R^1$ of formula I or is P-Sp, and P, Sp, Z, A, $L^1$, $L^2$, r1 and r2 have the meanings of formula I and m3 is 0, 1, 2 or 3.

Very preferred are compounds of formula III wherein $R^3$ is P-Sp. Further preferred are compounds of formula III wherein m3 is 0 or 1, Z is —COO—, —OCO— or a single bond, A is 1,4-phenylene optionally substituted by 1 or 2 groups $L^1$ or trans-1,4-cyclohexylene. Very preferred are the following compounds

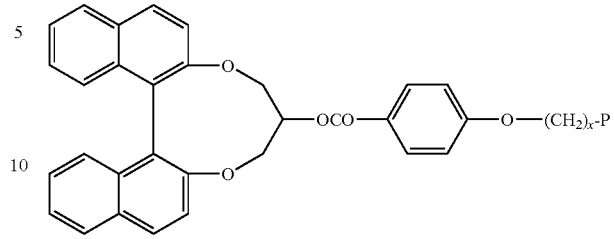

IIIa wherein x is an integer from 1 to 12 and P is as defined in formula I.

Component D) preferably comprises one or more compounds having a nematic phase, preferably an enantiotropic nematic phase, and a clearing point (nematic-isotropic phase transition temperature) of 85° C. or higher, preferably 100° C. or higher. Very preferred are compounds selected of formula IV

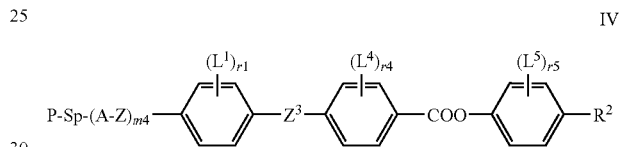

IV wherein P, Sp, A, Z, $L^1$, $L^2$, r1, r2 have the meanings of formula I,
m4 is 0, 1 or 2,
$Z^3$ is —COO—, —OCO— or a single bond,
$L^4$, $L^5$ have independently of each other one of the meanings of $L^1$ in formula I,
r4, r5 are independently of each other 0, 1, 2, 3 or 4, with r4+r5>0,
$R^2$ is H, halogen, CN, NCS, $SF_5$ or straight chain or branched alkyl with 1 to 20 C-atoms that is optionally mono- or polysubstituted by F, Cl, Br, I or CN, and wherein one or more non-adjacent $CH_2$ groups are optionally replaced, in each case independently from one another, by —O—, —S—, —$NR^o$—, —$SiR^oR^{oo}$—, —CO—, —COO—, —OCO—, —OCO—O—, —$NR^o$—CO—, —CO—$NR^o$—, —$NR^o$— CO—$NR^o$—, —S—CO—, —CO—S—, —$CY^1$=$CY^2$— or —C≡C— in such a manner that O and/or S atoms are not linked directly to one another.

Especially preferred are compounds of formula IV wherein m4 is 0 or 1, most preferably 0, $Z^3$ is —COO—, r1 is 0, r4 is 1 and r5 is 0 or 1. Very preferred are compounds of the following formula

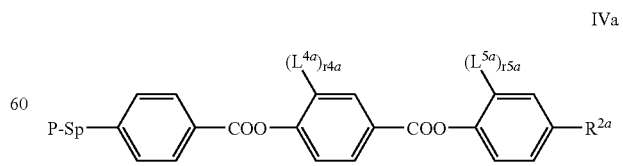

IVa wherein P and Sp are as defined in formula I,
$L^{4a,5a}$ are independently of each other F, Cl, $CH_3$, $C_2H_5$, $OCH_3$ or $COCH_3$, r4a, r5a are 0 or 1, with r4a+r5a>0, $R^{2a}$ is Cl or optionally mono- or polyfluorinated straight-chain alkyl with 1 to 12 C-atoms, preferably 1 to 6 C-atoms wherein one or two non-adjacent CH$_2$-groups are optionally replaced by —O—, —S—, —CO—, —COO—, —OCO—, —OCO—O—, —S—CO— or —CO—S— in such a manner that O and/or S atoms are not linked directly to one another.

Especially preferred are compounds of formula IVa wherein r4a is 1, r5a is 0, $L^{4a}$ or $L^{5a}$ is Cl or OCH$_3$, $R^{2a}$ is Cl, CN, OCH$_3$, OC$_2$H$_5$, SCH$_3$, SC$_2$H$_5$, OCF$_3$, OCHF$_2$, OCH$_2$F or OC$_2$F$_5$, very preferably Cl or OCH$_3$.

Component E) preferably comprises a mesogenic or liquid crystal photoinitiator.

As dichroic photoinitiator for example the following compounds can be used

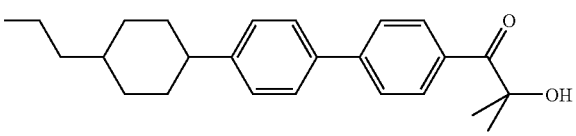

Especially preferred are dichroic photoinitiators comprising an α-amino group as disclosed in EP-A-1 388 538, in particular those of formula V

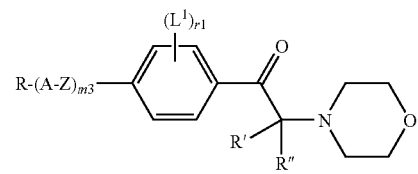
V wherein A, Z, m3, $L^1$ and r1 are as defined above, and R, R' and R" have one of the meanings of $R^1$ in formula I. R' and R" are preferably selected from alkyl or alkoxy with 1 to 6 C-atoms. R is preferably an unpolar group as defined above.

Very preferred compounds of formula V are the following

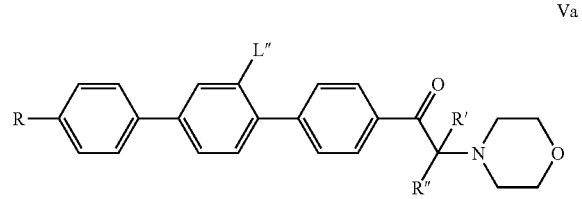
Va

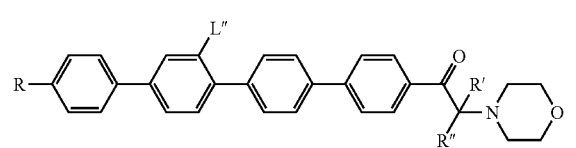
Vb

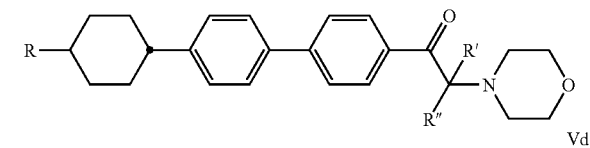
Vc

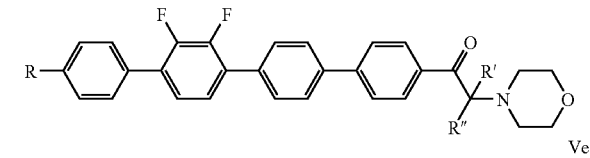
Vd

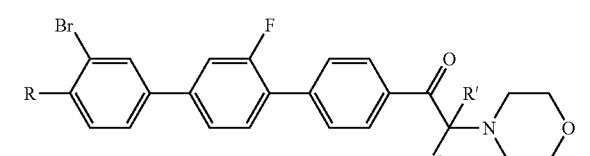
Ve

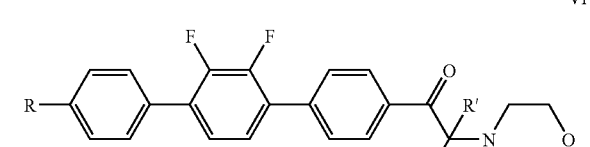
Vf

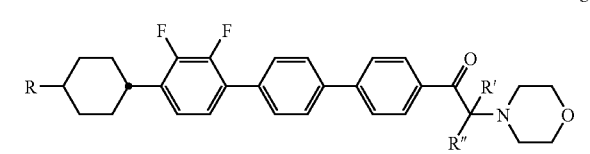
Vg wherein L" is H or F, R is alkyl or alkoxy with 1 to 12 C-atoms, R' and R" are selected from alkyl or alkoxy with 1 to 6 C-atoms, very preferably from methyl, ethyl or propyl.

In the formulae shown above and below, R, $R^1$ and $R^2$ can be a polar or an unpolar group. Polar groups are preferably selected from halogen, CN, NCS, SF$_5$, OCH$_3$, optionally mono- or polyfluorinated alkylcarbonyl, alkoxycarbonyl, alkylcarbonyloxy or alkoxycarbonyloxy with 1 to 4 C-atoms, and mono-, oligo- or polyfluorinated alkyl or alkoxy with 1 to 4 C-atoms. Unpolar groups are preferably selected from optionally halogenated alkyl, alkoxy, alkylcarbonyl, alkoxycarbonyl, alkylcarbonyloxy or alkoxycarbonyloxy with 1 or more, preferably 1 to 15 C-atoms which is not covered by the above definition of 'polar group'.

Especially preferred polar groups are selected of F, Cl, CN, OCH$_3$, COCH$_3$, COC$_2$H$_5$, COOCH$_3$, COOC$_2$H$_5$, CF$_3$, CHF$_2$, CH$_2$F, OCF$_3$, OCHF$_2$, OCH$_2$F, C$_2$F$_5$ and OC$_2$F$_5$, in particular F, Cl, CN, CF$_3$, OCHF$_2$ and OCF$_3$. Especially preferred unpolar groups are selected from unsubstituted alkyl with 1 to 12 C-atoms or unsubstituted alkoxy with 2 to 12 C-atoms.

If R, $R^1$ or $R^2$ is an alkyl or alkoxy group, i.e. where the terminal CH$_2$ group is replaced by —O—, this may be straight-chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, methoxy, ethoxy, propoxy, butoxy, pentoxy, hexoxy, heptoxy, or octoxy, furthermore nonyl, decyl, undecyl, dodecyl, tridecyl, tetradecyl, pentadecyl, nonoxy, decoxy, undecoxy, dodecoxy, tridecoxy or tetradecoxy, for example.

If R, R¹ or R² is oxaalkyl, i.e. where one $CH_2$ group is replaced by —O—, it is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

If R, R¹ or R² is alkylsulfanyl(thioether), i.e. alkyl where the $CH_2$ group that is linked to the adjacent group is replaced by —S—, it is preferably straight-chain, has 1, 2, 3, 4, 5, 6, 7 or 8 carbon atoms and accordingly is preferably methylsulfanyl, ethylsulfanyl, propylsulfanyl, butylsulfanyl, pentylsulfanyl, hexylsulfanyl, heptylsulfanyl, octylsulfanyl, furthermore nonylsulfanyl, decylsulfanyl, undecylsulfanyl or dodecylsulfanyl, for example.

R, R¹ or R² can be an achiral or a chiral group.

In the formulae shown above and below, A is preferably selected from 1,4-cyclohexylene, 1,4-phenylene, tetrahydropyrane-2,5-diyl, dioxane-2,5-diyl, furane-2,5-diyl, thiophene-2,5-diyl, pyrrol-2,5-diyl, pyridine-2,5-diyl, pyrimidine-2,5-diyl, naphthalene-2,6-diyl, 1,2,3,4-tetrahydronaphthalene-2,6-diyl, decaline-2,6-diyl, indane-2,5-diyl, these groups optionally being mono- or polysubstituted by $L^1$ as defined above.

Z, $Z^0$ and $Z^{1-3}$ are preferably selected from —COO—, —OCO—, —$CH_2CH_2$—, —$OCF_2$—, —$CF_2O$—, —$CY^1$=$CY^2$— or a single bond, very preferably —COO—, —OCO— or a single bond.

$L^{1-5}$ are preferably selected from F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$, in particular F, Cl, CN, $CH_3$, $C_2H_5$, $OCH_3$, $COCH_3$ or $OCF_3$, most preferably F, Cl, $CH_3$, $OCH_3$ or $COCH_3$.

Preferably -(A-Z)$_{m1}$-, -(A-Z)$_{m2}$-, -(A-Z)$_{m3}$- and -(A-Z)$_{m4}$-, are selected from the groups listed below and their mirror images. Therein, Phe is 1,4-phenylene, PheL is 1,4-phenylene that is substituted by 1 to 4 groups $L^1$ as defined above, Cyc is 1,4-cyclohexylene and Z has one of the meanings of $Z^1$ in formula I.

| | |
|---|---|
| -Phe-Z- | M1 |
| -Cyc-Z- | M2 |
| -PheL-Z- | M3 |
| -Cyc-Z-Cyc-Z- | M4 |
| -Phe-Z-Cyc-Z- | M5 |
| -PheL-Z-Cyc-Z- | M6 |
| -Phe-Z-Phe-Z- | M7 |
| -PheL-Z-Phe-Z- | M8 |
| -PheL-Z-PheL-Z- | M9 | wherein Z is preferably —COO—, —OCO—, —$OCF_2$—, —$CF_2O$—, —$CH_2CH_2$—, —CH=CH— or a single bond.

PheL in these preferred formulae is preferably denoting

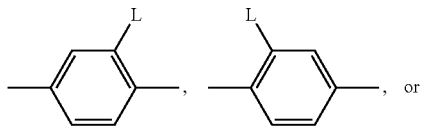

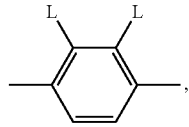

furthermore

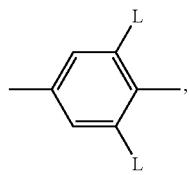

with L having each independently one of the meanings given above.

Halogen is preferably F or Cl.

$Y^1$ and $Y^2$ are preferably H or F.

The polymerisable group P is a group that is capable of participating in a polymerisation reaction, like radicalic or ionic chain polymerisation, polyaddition or polycondensation, or capable of being grafted, for example by condensation or addition, to a polymer backbone in a polymeranaloguous reaction. Especially preferred are polymerisable groups for chain polymerisation reactions, like radicalic, cationic or anionic polymerisation. Very preferred are polymerisable groups comprising a C—C double or triple bond, and polymerisable groups capable of polymerisation by a ring-opening reaction, like oxetanes or epoxides.

Very preferably the polymerisable group P is selected from $CH_2$=$CW^1$—COO—, $CH_2$=$CW^1$—CO—, $CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO-$CW^2W^3$—, HS-$CW^2W^3$—, $HW^2$N—, HO-$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, Cl, CN, $CF_3$, phenyl or alkyl with 1 to 5 C-atoms, in particular H, $C_1$ or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted by one or more groups L as defined above, and $k_1$ and $k_2$ being independently of each other 0 or 1.

Especially preferred groups P are $CH_2$=CH—COO—, $CH_2$=C($CH_3$)—COO—, $CH_2$=CH—, $CH_2$—CH—O—, ($CH_2$=CH)$_2$CH—OCO—, ($CH_2$=CH)$_2$CH—O—,

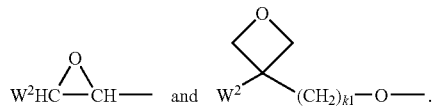

Very preferred are acrylate and oxetane groups. Oxetanes produce less shrinkage upon polymerisation (cross-linking), which results in less stress development within films, leading to higher retention of ordering and fewer defects. Oxetane cross-linking also requires a cationic initiator, which unlike free radical initiator is inert to oxygen.

As for the spacer group Sp all groups can be used that are known for this purpose to the skilled in the art. The spacer group Sp is preferably of formula Sp'-X, such that P-Sp- is P-Sp'-X—, wherein Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a manner that O and/or S atoms are not linked directly to one another, X is —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C—, —CH=CH—COO—, —OCO—CH=CH— or a single bond, $R^0$ and $R^{00}$ are independently of each other H or alkyl with 1 to 12 C-atoms, and $Y^1$ and $Y^2$ are independently of each other H, F, Cl or CN.

X is preferably —O—, —S—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C— or a single bond, in particular —O—, —S—, —C≡C—, —$CY^1$=$CY^2$— or a single bond, very preferably a group that is able to from a conjugated system, such as —C≡C— or —$CY^1$=$CY^2$—, or a single bond.

Typical groups Sp' are, for example, —($CH_2$)$_p$—, —($CH_2CH_2O$)$_q$—$CH_2CH_2$—, —$CH_2CH_2$—S—$CH_2CH_2$— or —$CH_2CH_2$—NH—$CH_2CH_2$— or —($SiR^0R^{00}$—O)$_p$—, with p being an integer from 2 to 12, q being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

Further preferred are compounds with one or two groups P-Sp- wherein Sp is a single bond. In case of compounds with two groups P-Sp, each of the two polymerisable groups P and the two spacer groups Sp can be identical or different.

In another preferred embodiment the group Sp' is a chiral group of the following formula

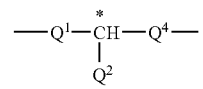

wherein
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another,
$Q^4$ is an alkylene or alkylene-oxy group with 1 to 10 C atoms or a single bond, being different from $Q^1$,
with $Q^1$ being linked to the polymerisable group P.

The polymerisable LC material according to the present invention preferably has a chiral smectic or chiral nematic (cholesteric) LC phase or a blue phase. Especially preferred is a cholesteric LC (CLC) material.

The polymerisable LC material preferably comprises one or more monofunctional chiral polymerisable mesogenic compounds and one or more di- or multifunctional achiral polymerisable mesogenic compounds.

Further to the compounds of component A-E) mentioned above, the polymerisable LC material may comprise one or more additional polymerisable mesogenic compounds. These additional compounds are preferably selected of the following formulae

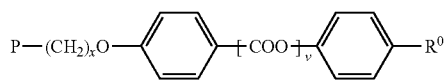

(R1)

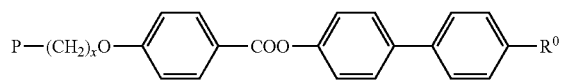

(R2)

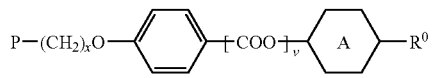

(R3)

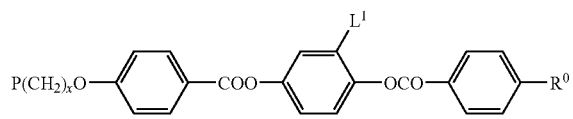

(R4)

-continued (R5)
$$P-(CH_2)_x-O-\phenyl-COO-[\phenyl-]_v-A-R^0$$

(R6)
$$P(CH_2)_x-O-\phenyl-\equiv-\phenyl-[A]_v-R^0$$

(R7)
$$P-(CH_2)_x-O-\phenyl-CH=CH-COO-\phenyl-R^0$$

(R8)
$$P-(CH_2)_x-O-\phenyl(F)-\phenyl(F)-\phenyl(F)-R^0$$

(R9)
$$P-(CH_2)_x-O-\phenyl-(COO)_u-\phenyl-[\phenyl-]_v^*-CH_2CH(CH_3)C_2H_5$$

(R10)
$$P-(CH_2)_x-O-\phenyl-COO-\phenyl(L^1)-COO-\phenyl-{}^*CH_2CH(CH_3)C_2H_5$$

wherein P and $L^1$ are as defined above, A is cyclohexylene or phenylene that is optionally substituted by 1 to 4 groups $L^1$, x is an integer from 1 to 12, u and v are independently of each other 0 or 1, $R^0$ is a polar or unpolar group as defined above, and the phenyl rings are optionally substituted by 1, 2, 3 or 4 groups $L^1$.

The compounds of formula I, IV, II, III and V and R1-R10 are known from prior art or can be synthesized according to or in analogy to methods which are known per se and which are described in standard works of organic chemistry such as, for example, Houben-Weyl, Methoden der organischen Chemie, Thieme-Verlag, Stuttgart.

Compounds of formula I are disclosed for example in U.S. Pat. No. 6,514,578. Compounds of formula IV are disclosed in U.S. Pat. No. 6,491,990. Compounds of formula III are disclosed in WO 02/94805. Compounds of formula V are disclosed in EP-A-1 388 538. Compounds of formula II and suitable additional polymerisable mesogenic compounds like those of formula R1-R10 are disclosed for example in WO 93/22397, U.S. Pat. No. 5,518,652, DE 195 04 224, U.S. Pat. No. 5,750,051, U.S. Pat. No. 5,770,107 and U.S. Pat. No. 6,514,578.

Further to components A)-E) the polymerisable LC material preferably comprises one or more components selected from F) one or more surfactants,
G) one or more non-mesogenic compounds having one, two or more polymerisable groups,
H) one or more chain transfer agents,
I) one or more dyes having an absorption maximum at a wavelength used to initiate photopolymerisation of the material.

In a preferred embodiment the polymerisable material comprises one or more surfactants F) to achieve planar alignment with a low tilt angle. Suitable surfactants are described for example in J. Cognard, Mol. Cryst. Liq. Cryst. 78, Supplement 1, 1-77 (1981). Particularly preferred are non-ionic surfactants, e.g. non-ionic fluorocarbon surfactants, like the commercially available Fluorad® (from 3M), or Zonyl FSN® (from DuPont), or polymerizable fluorocarbon surfactants as disclosed in EP 1 256 617 A1. Further preferred are multiblock surfactants as disclosed in GB 2 383 040 A.

In another preferred embodiment the polymerisable material comprises one or more non-mesogenic polymerisable compounds G), preferably in a concentration from 0 to 30%, preferably 0 to 20%. Typical examples of monoreactive non-mesogenic compounds are alkylacrylates or alkylmethacrylates. Typical examples for direactive non-mesogenic compounds are alkyldiacrylates or alkyldimethacrylates with alkyl groups of 1 to 20 C atoms. Typical examples for multi-reactive non-mesogenic compounds are trimethylpropanetrimethacrylate or pentaerythritoltetraacrylate.

In another preferred embodiment the polymerisable material comprises one or more chain transfer agents H), in order to modify the physical properties of the polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or LC thiol compounds as for example disclosed in WO 96/12209, WO 96/25470 or U.S. Pat. No. 6,420,001. When adding a chain transfer agent, the length of the free polymer chains and/or the length of the polymer chains between two crosslinks in the polymer film can be controlled. When the amount of the chain transfer agent is increased, the polymer chain length in the polymer film is decreasing.

In another preferred embodiment the polymerisable material comprises one or more dyes 1) having an absorption maximum at the wavelength of the radiation used for polymerisation of the material. Especially preferred are UV dyes like e.g. 4,4'-azoxy anisole or the commercially available Tinuvin (from Ciba AG, Basel, Switzerland).

A preferred polymerisable LC mixture comprises
A) 5 to 60%, preferably 10 to 40%, very preferably 15 to 30% of one or more compounds of formula I,
B) 5 to 80%, preferably 10 to 65%, very preferably 15 to 55% of one or more mesogenic compounds having two or more polymerisable groups,
C) 0.1 to 20%, preferably 1 to 15%, very preferably 2 to 10% of one or more chiral compounds,
D) 0 to 70%, preferably 5 to 60%, very preferably 10 to 50% of one or more compounds of formula IV,
E) 0.1 to 15%, preferably 0.5 to 10%, very preferably 1 to 7% of one or more dichroic photoinitiators, F) 0 to 10%, preferably 0.01 to 5%, very preferably 0.05 to 3% of one or more surfactants, G) 0 to 30%, preferably 5 to 20% of one or more mono-, di- or multifunctional polymerisable non-mesogenic compounds, H) 0 to 15%, preferably 0.5 to 7% of one or more chain transfer agents, I) 0 to 10%, preferably 0.1 to 7% of one or more dyes having an absorption maximum at the wavelength used for polymerisation of the material.

The polymerisable LC material according to the present invention can be used for the preparation of biaxial films. Thus, another aspect of the invention relates to a biaxial film which is obtainable from the polymerisable material as described above and below.

The biaxial film according to the present invention preferably has a cholesteric structure with a distorted helix, resulting in an elliptical, discotic refractive index ellipsoid. Furthermore, the pitch of the cholesteric helix has a value well below the visible wavelength range, preferably below 225 nm, so that only the average directional refractive indices are experienced. As a consequence the Bragg reflection bands occur in the UV range of light, so the film is transparent to visible wavelengths of light and behaves purely as retarders between crossed polarisers for these visible wavelengths.

The biaxial film has optical biaxial negative C symmetry with $n_x > n_y > n_z$, wherein $n_x$ and $n_y$ are the principal refractive indices in orthogonal directions within the film plane and $n_z$ is the principal refractive index perpendicular to the film plane.

The reflection wavelength of the biaxial film is preferably below 380 nm. Further preferred is a biaxial film that is substantially transparent for light with a wavelength of 400 nm or higher, preferably 380 nm or higher. Very preferably the biaxial film is substantially transparent for visible light with a wavelength from 380 to at least 780 nm.

The thickness of the biaxial film is preferably from 0.5 to 5 μm, very preferably from 0.5 to 3 μm.

The on-axis retardation (previously defined as $R_0$) of a biaxial film according to the present invention is preferably from 10 to 150 nm, very preferably from 20 to 100 nm, most preferably from 30 to 80 nm.

Another preferred embodiment relates to a biaxial film with approximately quarter wave (λ/4) retardation (λ=wavelength of incident light) for use as quarter wave retardation film (QWF). Especially preferred for such uses are retardation values from 90 to 200 nm, preferably from 100 to 175 nm.

Another preferred embodiment relates to a biaxial film with approximately half wave (λ/2) retardation for use as half wave retardation film (HWF). Especially preferred for such uses are retardation values from 180 to 400 nm, preferably from 200 to 350 nm.

Another aspect of the invention relates to a method of preparing a biaxial film. Especially preferred is a process of preparing a biaxial film by providing a layer of a polymerisable LC material as described above and below on a substrate, aligning the material in its LC phase into planar orientation, photopolymerising the material by exposure to linear polarised light, and optionally removing the polymerised material from the substrate.

Very preferably the biaxial film is prepared in analogy to the method as described in WO 03/54111. According to this method, a polymerisable cholesteric LC material is coated as a thin film onto a substrate, where it adopts a planar orientation with the cholesteric helix being substantially perpendicular to the plane of the film. Planar alignment of the LC material can be aided by adding aligning agents such as surfactants, or by applying an alignment layer to the substrate and/or rubbing the substrate or the alignment layer. The material can also be annealed at high temperatures to improve alignment.

The aligned cholesteric material is then exposed to linear polarised UV light. The dichroic photoinitiator (E) present in the material locally aligns with its UV-absorbing axis parallel to the LC director. When illuminated with polarised UV light, polymerisation-initiating free radicals are predominantly produced where the local director lies parallel to the direction of polarisation.

Inhomogeneous free-radical production results in local polymerisation, predominantly of the highly reactive components, like the di- or multifunctional polymerisable compounds. This results in concentration gradients between the high and low reactive components within a half turn of the helix. The highly reactive components become concentrated where the director lies parallel to the E-field (maximum concentration of free radicals) and the less reactive components, like the monofunctional polymerisable or non-polymerisable compounds, become concentrated where the director is perpendicular to the E-field. Localised variation of the chiral component results in distortion of the sinusoidal helix (which above and below is also referred to as 'distorted' or 'deformed' helix).

By using the polymerisable LC material according to the present invention it is possible to achieve films with a biaxiality index BI of 0.2 or more. The biaxial films according to the present invention preferably have a value of BI≧0.14, in particular ≧0.20, very preferably ≧0.25, most preferably ≧0.30.

The polymerisable LC chiral mixture is preferably designed such that its selective reflection wavelength is below the wavelength of light that is normally used for polymerisation (typically UV light of about 365 nm) and enables local variation of the birefringence. This is achieved by using chiral compounds of formula III with high twist to push the Bragg reflection band into the UV, and by using improved dichroic photoinitiators, especially those of formula V.

The polymerisable LC chiral mixture according to the present invention allows to make the film production process suitable for manufacture on a plastic substrate, with a cure time of less than 3 minutes, preferably less than 1 minute, which is especially suitable for mass production.

The polymerisable LC mixture according to the present invention has a high clearing point and allows polymerisation at higher temperature within the LC phase. It was found that, by increasing the polymerisation temperature to a certain extent within the LC phase of the polymerisable material, it is possible to increase the biaxiality of the resulting polymer film. Therefore, polymerisable LC mixtures with high clearing points are especially suitable and preferred. Preferably the polymerisation temperature is selected, within the LC phase of the polymerisable material, in a range from 40° C. to 100° C., in particular from 40° C. to 90° C., preferably from 50° C. to 80° C., very preferably from 55 to 65° C. or from 60 to 80° C.

It is also possible, by varying the polarisation direction of the linear polarised photoradiation, to control the direction of the slow axis of the biaxial film (the "slow axis" corresponds to the x-direction, i.e. the direction of the highest refractive index $n_x$). For example, irradiation with linear polarised UV light can be achieved by passing UV light through a polariser (e.g. a commercially available dye-doped absorption polarizer). The direction of the slow axis in the resulting biaxial film will then correspond to the direction of the transmission axis of the polariser. By rotating the polariser, the direction of the slow axis can thus be controlled.

In another preferred embodiment of the present invention the optically biaxial film comprises at least two areas with different retardation birefringence or a pattern of two or more areas having different retardation.

Such a film can be prepared by the method as described above, wherein only selected areas of the polymerisable material are polymerised. This is achieved for example by photopolymerisation through a photomask so that only the uncovered areas are exposed to UV light. Different areas are then polymerised under different conditions, e.g. at different curing temperature, leading to a change in on-axis retardation.

It is also possible to prepare a biaxial film that comprises a pattern of one or more, preferably one, two or three different regions having different retardation values, each of said values being adjusted such that its efficiency of converting linearly polarised light into circularly polarised light is optimised for light of one of the primary colours red, green and blue (R, G, B). In particular, said values of retardation are as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

For preparation of the biaxial film, the polymerisable material is preferably coated or printed onto substrate, aligned into a uniform orientation and polymerised to permanently fix the orientation. As a substrate for example a glass or quarz sheet or a plastic film or sheet can be used. It is also possible to put a second substrate on top of the coated mixture prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerized film after polymerisation, preferably isotropic substrates are used.

Preferably at least one substrate is a plastic substrate such as for example a film of polyester such as polyethyleneterephthalate (PET) or polyethylenenaphthalate (PEN), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from DuPont Teijin Films under the trade name Melinex®.

The polymerisable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable material in a suitable solvent. This solution is then coated or printed onto the substrate, for example by spin-coating or printing or other known techniques, and the solvent is evaporated off before polymerization. In most cases it is suitable to heat the mixture in order to facilitate the evaporation of the solvent. As solvents for example standard organic solvents can be used. the solvents can be selected for example from ketones like e.g. acetone, methyl ethyl ketone, methyl propyl ketone or cyclohexanone, acetates like e.g. methyl, ethyl or butyl acetate or methyl acetoacetate, alcohols like e.g. methanol, ethanol or isopropyl alcohol, aromatic solvents like e.g. toluene or xylene, halogenated hydrocarbons like e.g. di- or trichloromethane, glycols or their esters like e.g. PGMEA (propyl glycol monomethyl ether acetate), γ-butyrolactone, and the like. It is also possible to use binary, ternary or higher mixtures of the above solvents.

Polymerisation of the material is preferably achieved by exposing it to heat or actinic radiation. Actinic radiation means irradiation with light, like UV light, IR light or visible light, irradiation with X-rays or gamma rays or irradiation with high energy particles, such as ions or electrons. Preferably polymerisation is carried out by photoirradiation, in particular with UV light, very preferably with linear polarised UV light. As a source for actinic radiation for example a single UV lamp or a set of UV lamps can be used. When using a high lamp power the curing time can be reduced. Another possible source for photoradiation is a laser, like e.g. a UV laser, an IR laser or a visible laser.

In addition to the dichroic photoinitiator of component E) the polymerisable material may also comprise one or more conventional photoinitators. As standard photoinitiator for radical polymerisation for example the commercially available Irgacure® 651, Irgacure® 184, Darocure® 1173 or Darocure® 4205 (all from Ciba Geigy AG) can be used, whereas in case of cationic photopolymerisation the commercially available UVI 6974 (Union Carbide) can be used.

The curing time is dependent, inter alia, on the reactivity of the polymerisable material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The polymerisable material can additionally comprise one or more other suitable components such as, for example, catalysts, sensitizers, stabilizers, chain-transfer agents, inhibitors, accelerators, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

Apart from using surfactants of component F), uniform alignment of the material can be aided for example by shearing the material, e.g. by means of a doctor blade. It is also possible to apply an alignment layer, for example a layer of rubbed polyimide or sputtered $SiO_x$, on top of at least one of the substrates. Alignment can also be achieved by rubbing the substrate without applying an additional alignment layer, e.g. by means of a rubbing cloth or a rubbing roller.

In a preferred embodiment the polymerisable LC material is annealed at a high temperature within the LC phase before polymerisation to improve the alignment, preferably at a temperature close to its clearing point, very preferably less than 5° C., most preferably less than 2° C. below its clearing point.

In some cases it is of advantage to apply a second substrate to aid alignment and exclude oxygen that may inhibit the polymerisation. In a preferred embodiment polymerisation is carried out under an atmosphere of inert gas like for example nitrogen or argon.

The biaxial film according to the present invention can be used alone or in combination with other retardation films as compensator or retarder, in particular for viewing angle compensation in LCDs.

Thus, another aspect of the invention relates to an LCD device comprising at least one biaxial film or compensator as described above and below.

Preferably the LCD device comprises the following elements an LC cell formed by two transparent substrates having surfaces which oppose each other, an electrode layer provided on the inside of at least one of said two transparent substrates and optionally superposed with an alignment layer, and an LC medium which is present between the two transparent substrates, a polariser arranged outside said transparent substrates, or a pair of polarisers sandwiching said substrates, and at least one biaxial film or compensator according to the present invention, being situated between the LC cell and at least one of said polarisers.

The above display elements can be separated, stacked, mounted on top of each other or connected by means of adhesive layers in any combination of these means of assembly.

The biaxial film and compensator according to the present invention can be used for compensation of conventional displays, in particular those of the TN (twisted nematic), HTN (highly twisted nematic) or STN (super twisted nematic) mode, in AMD-TN (active matrix driven TN) displays, in displays of the IPS (in plane switching) mode, which are also known as 'super TFT' displays, in displays of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, or transflective displays.

Especially preferred are TN, STN, VA, MVA, OCB and pi-cell displays.

Preferably the biaxial film is used as optical retardation film in an LCD not outside the switchable LC cell of the display, but between the substrates, usually glass substrates, forming the switchable LC cell and containing the switchable LC medium (incell application). This avoids parallax problems and allows to reduce the total thickness of the LCD device.

A further preferred LCD comprises an LC cell formed by two plane parallel substrates at least one of which is transparent to incident light, an electrode layer provided on the inside of at least one of said two transparent substrates and optionally superposed with an alignment layer, and an LC medium which is present between the two substrates and is switchable between at least two different states by application of an electric field, a first linear polariser on one side of the LC cell, optionally a second linear polariser on the side of the LC cell opposite to that of said first linear polariser, at least one biaxial film as described above and below that is positioned between the two plane parallel substrates of said LC cell.

An especially preferred LCD comprises an LC cell comprising the following elements a first and a second substrate plane parallel to each other, at least one of which is transparent to incident light, an array of nonlinear electric elements on one of said substrates which can be used to individually switch individual pixels of said LC cell, said elements being preferably active elements like transistors, very preferably TFTs, a colour filter array provided on one of said substrates, preferably on the substrate opposite to that carrying the array of nonlinear elements, and having a pattern of different pixels transmitting one of the primary colours red, green and blue (R, G, B), said colour filter optionally being covered by a planarisation layer, a first electrode layer provided on the inside of said first substrate, optionally a second electrode layer provided on the inside of said second substrate, optionally first and second alignment layers provided on said first and second electrodes, an LC medium that is switchable between at least two different orientations by application of an electric field, a first (or 'front') linear polariser on the first side of the LC cell, optionally a second (or 'back') linear polariser on the second side of the LC cell, and at least one biaxial film as described above and below that is situated between the first and second substrate of the LC cell, preferably between the colour filter and the liquid crystal medium, very preferably between the colour filter and one of said electrode layers, or if a planarisation layer is present, between the planarising layer and one of said electrode layers.

Another preferred embodiment relates to a biaxial film with a pattern of areas or pixels with three different retardations, the retardation values in these regions being adjusted such that the efficiency of converting linearly polarised light into circularly polarised light in each region or pixel is optimised for one of the colours R, G and B, and is preferably positioned on the colour filter such that each R-, G- or B-pixel of the colour filter is covered by a corresponding pixel of the biaxial film having a retardation optimised for this colour.

For example, a pixelated biaxial QWF can be constructed having three types of pixels with a retardation of approximately 112 nm, 137 nm and 150 nm, which correspond to approximately a quarter of the wavelength of the blue (B) pixel at 450 nm, green (G) pixel at 550 nm and red (R) pixel at 600 nm of the colour filter, respectively. A pixelated HWF can be prepared analoguously. In contrast, an unpixelated film will only provide an average uniform property for all areas of the display.

Alternatively or in addition to the RGB-pattern, the biaxial film can also have a pattern of areas having QWF (or HWF) retardation and areas having another retardation, e.g. zero retardation. Such a patterned film is especially suitable for as compensater in a patterned transflective display, e.g. a hole-in-mirror type transflective display as described e.g. in WO 03/019276 A2 or in van der Zande et al., SID Digest 14.2, 2003, page 194-197, S. Roosendaal et al., SID Digest 8.1, 2003, page 78-81 and M. Kubo et al., Proceedings of the IDW 1999, page 183-186.

It is also possible to use an unpatterned biaxial film according to the present invention for use in an LCD, e.g. of the VA or MVA type, as incell film.

In the foregoing and the following, all temperatures are given in degrees Celsius, and all percentages are by weight, unless stated otherwise. The following abbreviations are used to illustrate the liquid crystalline phase behaviour of the compounds: C=crystalline; N=nematic; S=smectic; N*, Ch=chiral nematic or cholesteric; I=isotropic. The numbers between these symbols indicate the phase transition temperatures in degree Celsius. Furthermore, mp is the melting point and cp is the clearing point (in ° C.).

The following examples shall illustrate the invention without limiting it.

Comparison Example 1

A polymerisable mixture is prepared as shown in example 2 of WO 03/054111, comprising

| Compound (B1) | 51.50% |
| Compound (B2) | 12.00% |
| Compound (a) | 8.00% |
| Compound (b) | 21.00% |
| Compound (C1) | 6.00% |
| Compound (e) | 1.00% |
| FC171 ® | 0.20% |

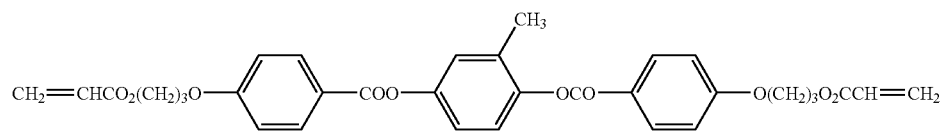

(B1)

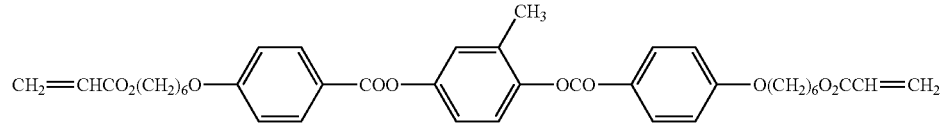

(B2)

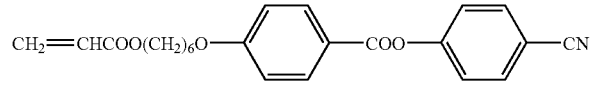

(a)

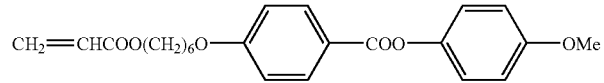

(b)

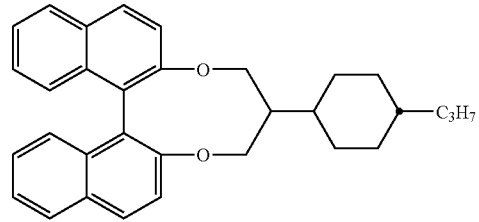

(C1)

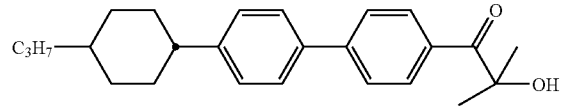

(e)

FC171 ® is surfactant commercially available surfactant from 3M (St. Paul, Minnesota, USA). Chiral compound (C1) is disclosed in WO 02/94805.

The HTP of a chiral dopant in an LC host material is given as HTP $(p*c)^{-1}$ (in $\mu m^{-1}$), wherein p is the pitch of the molecular helix (in μm) and c is the concentration (in wt. %) of the chiral compound in the host (a concentration of 1% by weight for example corresponds to c=0.01). Unless stated otherwise, specific HTP values given above and below relate to a dopant concentration of 1% in the LC host mixture MLC-6260 (commercially available from Merck KGaA, Darmstadt, Germany) at 20° C.

A biaxial polymer film is prepared from this mixture as described in example 2 of WO 03/054111. The retardation of the biaxial film is measured through a range of viewing angles and the biaxiality index BI calculated. The results are shown in table 1 below.

EXAMPLE 1

1a) Compound of Formula Ia

Compound (A1) is prepared as described above in scheme 1.

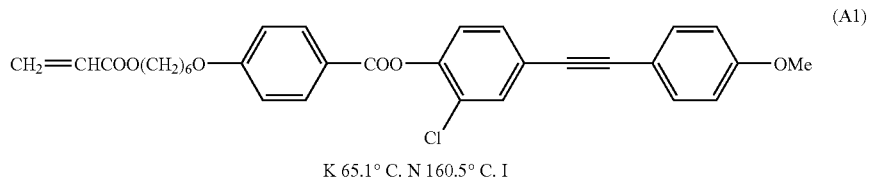

(A1)

K 65.1° C. N 160.5° C. I

1b) Polymerisable Mixture
The following polymerisable mixture is prepared

| | |
|---|---|
| Compound (A1) | 19.60% |
| Compound (B1) | 19.20% |
| Compound (a) | 11.20% |
| Compound (b) | 33.62% |
| Compound (C2) | 2.00% |
| Paliocolor LC756 ® | 9.80% |
| Compound (E1) | 4.00% |
| FC171 ® | 0.50% |
| Irganox 1076 ® | 0.08% |

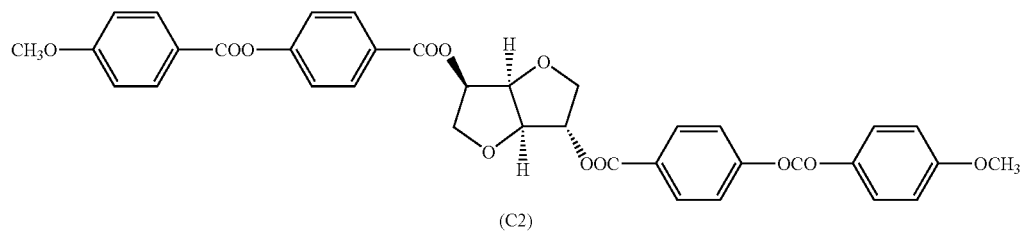

(C2)

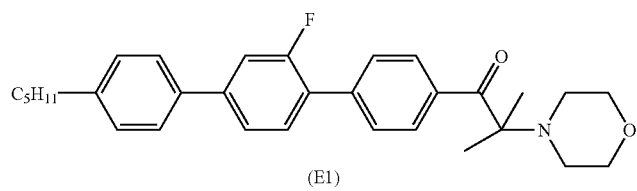

(E1)

Paliocolor LC756 ® is a reactive polymerisable chiral material commercially available from BASF AG (Ludwigshafen, Germany). Irganox 1076 ® is commercially available from Ciba AG (Basel, Switzerland). Chiral compound (C2) is disclosed in WO 98/00428. Dichroic photoinitiator (E1) is disclosed in EP 1 388 538.

The mixture has a cholesteric phase and a clearing point of 59.6° C.

The mixture is dissolved in PGMEA to give a 45% w/w solution. The solution is spin-coated onto a rubbed polyimide substrate using a spin speed of 2000 rpm. The solvent is evaporated at ambient temperature and the coating is annealed for 1 minute at 57° C. The coating is then photopolymerised in an inert atmosphere through a UV linear polariser using UV light of 365 nm for 1 minute at room temperature to give a polymer film.

After photopolymerisation, the retardation of the polymer film is measured through a range of viewing angles and the biaxiality index BI calculated. The results are shown in table 1.

The retardation profile of the polymer film (retardation in nm on the x-axis versus viewing angle in degrees on the y-axis) is shown in FIG. 1.

EXAMPLES 2-3

A polymer film is prepared from a polymerisable mixture as described in example 1, but wherein compound (E1) is replaced by compound (E2) (example 2, cp 65.3° C.) and (E3) (example 3, cp 59.1° C.), respectively, in the same amount (annealing temperature 63° C.).

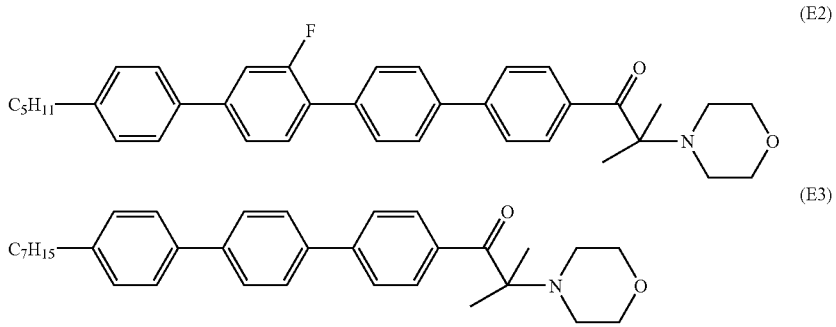

The retardation at different viewing angles and the biaxiality index BI of the polymer films are shown in table 1. The retardation profiles of the films are shown in FIG. 1.

TABLE 1

Retardation (nm) for polymer films of comparison example 1 and examples 1-3 measured at different viewing angles

| Sample | Viewing Angle | | | | | | | BI |
|---|---|---|---|---|---|---|---|---|
| | −60° | −40° | −20° | 0° | 20° | 40° | 60° | |
| Comp. Ex. 1 | −68.5 | −30.7 | −0.3 | 8.5 | −1.9 | −32.1 | −70.9 | 0.040 |
| Ex. 1 | −40.0 | 9.1 | 37.6 | 47.3 | 36.8 | 6.9 | −35.8 | 0.206 |
| Ex. 2 | −37.1 | 12.2 | 41.6 | 51.8 | 42.6 | 12.8 | −29.3 | 0.226 |
| Ex. 3 | −35.3 | 14.0 | 43.4 | 53.7 | 43.2 | 14.4 | −27.6 | 0.234 |

EXAMPLES 4-5

The following polymerisable mixture is prepared

| Compound (A1) | 19.60% |
| Compound (B1) | 21.40% |
| Compound (a) | 11.20% |
| Compound (b) | 33.62% |
| Compound (C3) | 9.60% |
| Compound (E2) | 4.00% |
| FC171 ® | 0.50% |
| Irganox 1076 ® | 0.08% |

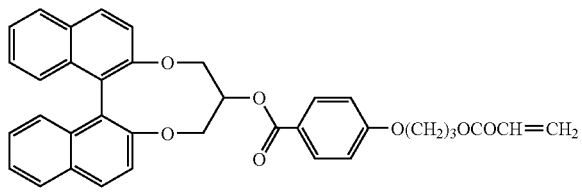

(C3)

Chiral compound (C3) is disclosed in WO 02/94805.

The mixture has a cholesteric phase and a clearing point of 55.1° C.

A polymer film (Example 4) is prepared from this mixture as described in example 1 (annealing temperature 53° C., curing temperature is room temperature).

Another polymer film (Example 5) is prepared from a polymerisable mixture as described above, but wherein compound (E2) is replaced by compound (E3) in the same amount (clearing point of the mixture 48.2° C.).

Figure 2:
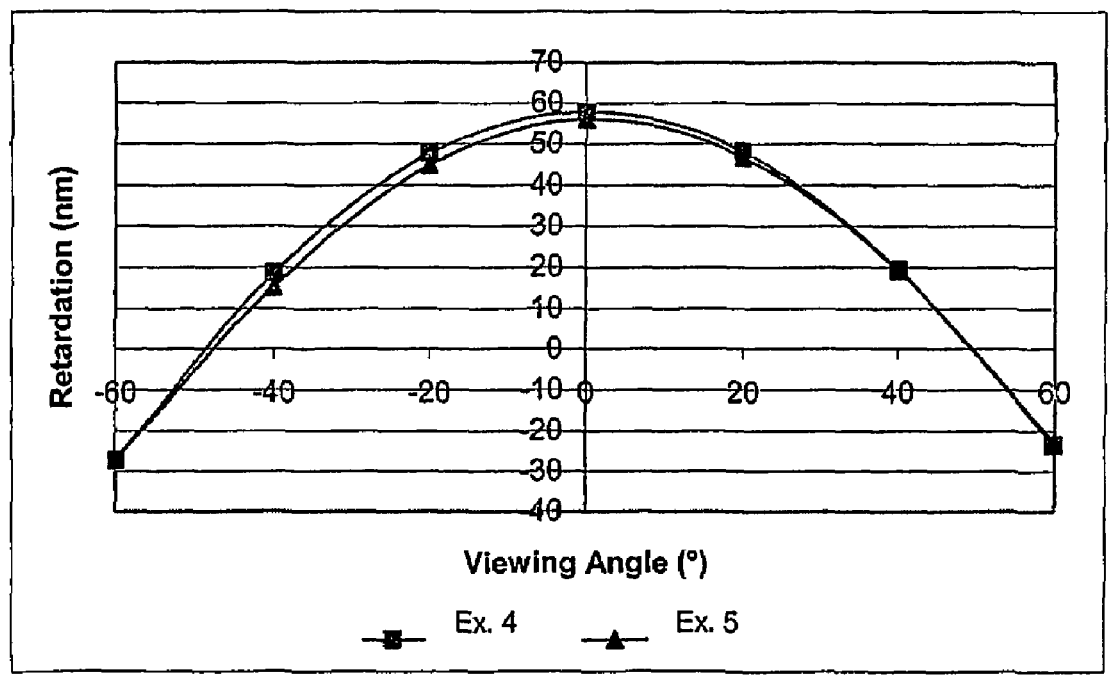
FIG. 2 shows the retardation profile of biaxial films according to examples 4 and 5 of the present invention.

The retardation at different viewing angles and the biaxiality index BI of the polymer films are shown in table 2. The retardation profiles of the films are shown in FIG. 2.

TABLE 2

Retardation (nm) for polymer films of examples 3 and 4 measured at different viewing angles

| Sample | Viewing Angle | | | | | | | BI |
|---|---|---|---|---|---|---|---|---|
| | −60° | −40° | −20° | 0° | 20° | 40° | 60° | |
| Ex. 4 | −27.3 | 18.6 | 47.6 | 57.8 | 48.1 | 19.3 | −23.5 | 0.257 |
| Ex. 5 | −27.3 | 15.3 | 44.8 | 56.0 | 46.7 | 19.1 | −22.9 | 0.256 |

EXAMPLE 6

The following polymerisable mixture is prepared

| Compound (A1) | 20.00% |
| Compound (B1) | 32.00% |
| Compound (B2) | 8.0% |
| Compound (C3) | 9.60% |
| Compound (D1) | 25.82% |
| Compound (E2) | 4.00% |
| FC171 ® | 0.50% |

-continued

Irganox ®    0.08%

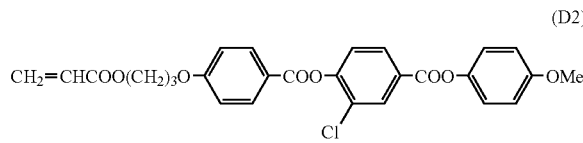

(D1)
K 60.8° C. N 138.6° C. I

Compound (D1) is disclosed in U.S. Pat. No. 6,491,990.

The mixture has a cholesteric phase and a clearing point of 96.6° C.

The mixture is dissolved in PGMEA to give a 45% w/w solution. The solution is spin-coated onto a rubbed polyimide substrate using a spin speed of 2000 rpm. The solvent is evaporated at ambient temperature and the coating is annealed for 1 minute at 98° C. The coating is then photopolymerised through a UV linear polarizer using UV light of 365 nm for 1 minute at 20° C. to give a polymer film. Further polymer film samples are prepared using the same method but photopolymerising at 40° C., 60° C. and 80° C., respectively.

After photopolymerisation, the retardation of the polymer film is measured through a range of viewing angles and the biaxiality index BI calculated. The results are shown in table 3.

TABLE 3

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −50.6 | 6.89 | 43.4 | 57 | 42.9 | 8.91 | −39.2 | 0.207 |
| 40° C. | −36.2 | 20 | 54.1 | 67 | 54.8 | 22.7 | −23.4 | 0.256 |
| 60° C. | −21.9 | 25.1 | 54.8 | 67.2 | 55.7 | 21.1 | −22.8 | 0.278 |
| 80° C. | −24.3 | 21.1 | 54.4 | 66.4 | 51.5 | 23.9 | −22.4 | 0.274 |

Figure 3A:
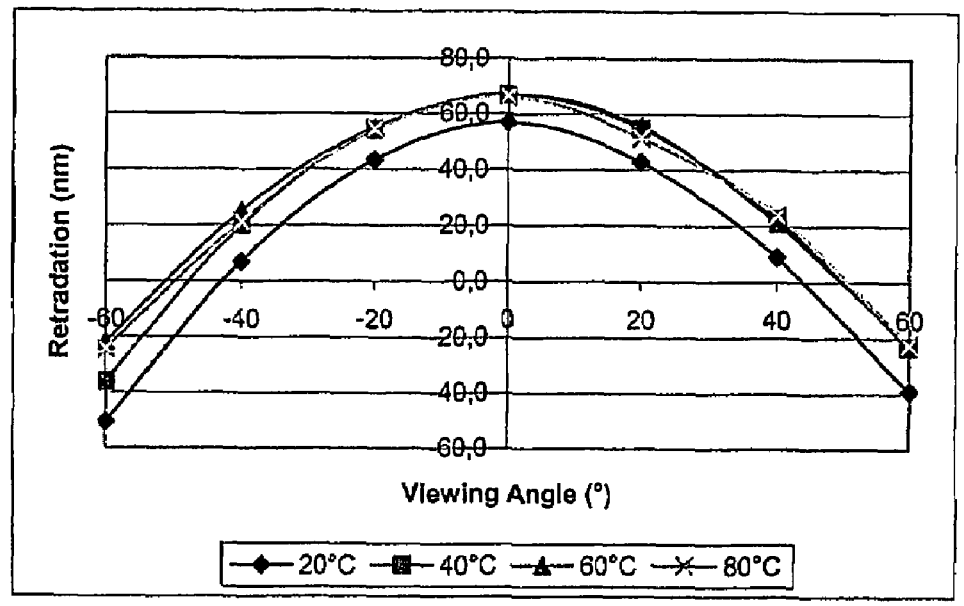
Figure 3B:
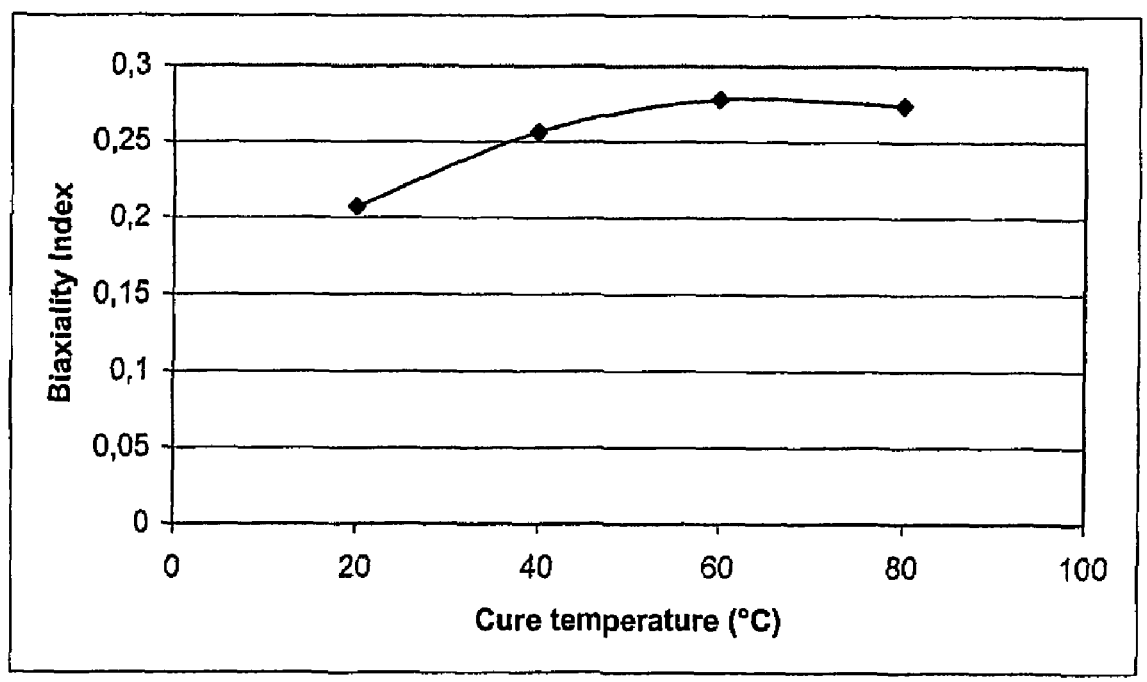

The retardation profiles of the polymer films are shown in FIG. 3A, the biaxiality index (BI) versus cure temperature in FIG. 3B.

EXAMPLE 7

Polymer films are prepared from a polymerisable mixture as described in example 6, but wherein compound (D1) is replaced by compound (D2) in the same amount (clearing point of the mixture is 101.5° C.).

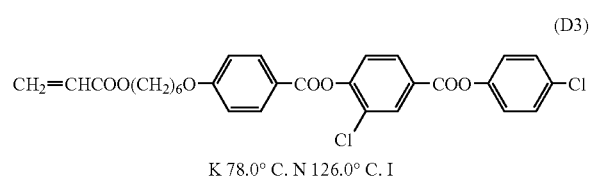

(D2)

K 101.0° C. N 159.0° C. I

Figure 4A:
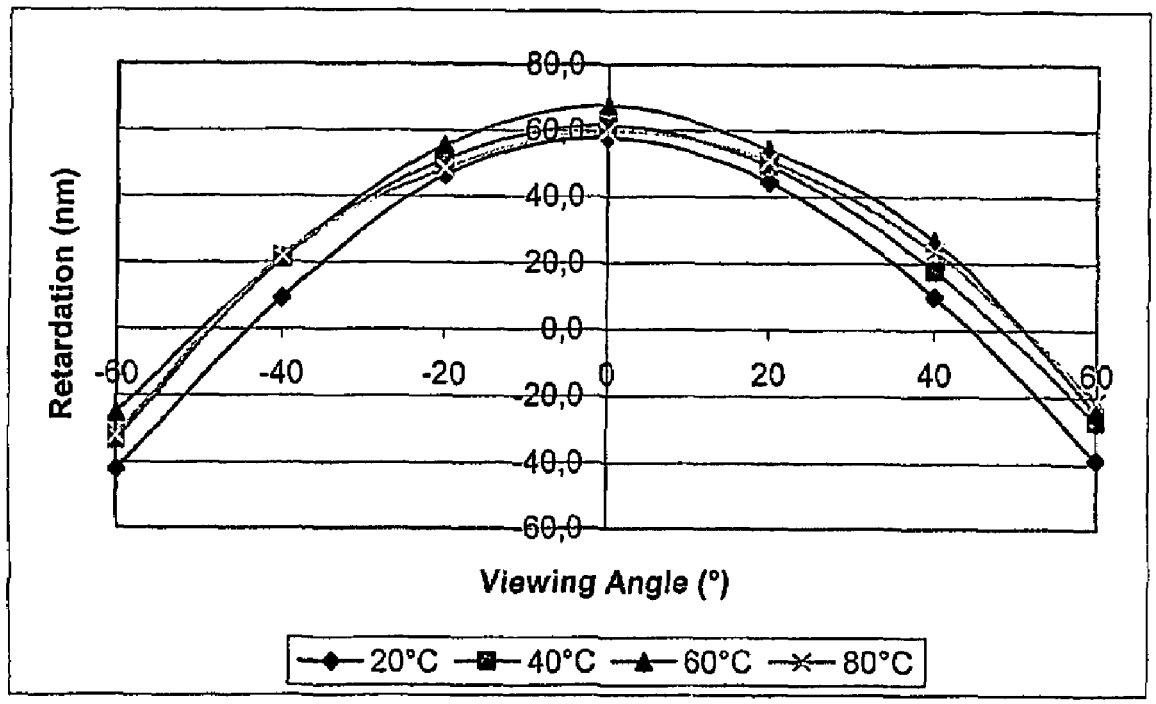
Figure 4B:
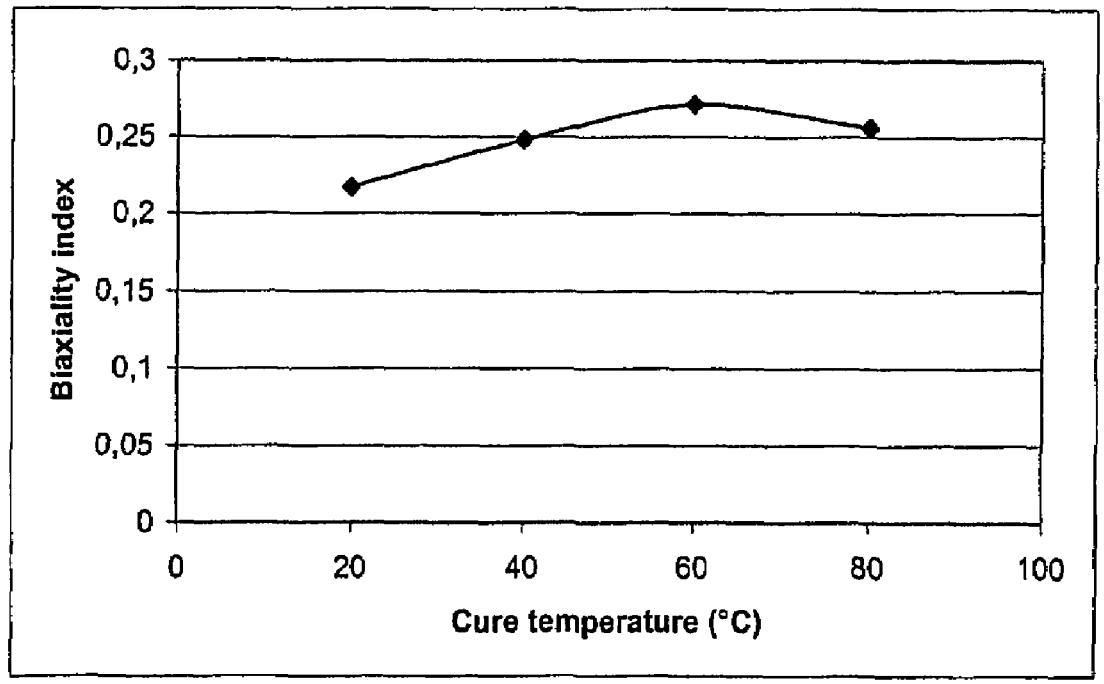

The retardation at different viewing angles and the biaxiality index BI of the polymer films are shown in table 4. The retardation profiles of the polymer films are shown in FIG. 4A, the biaxiality index versus cure temperature in FIG. 4B.

TABLE 4

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −42.3 | 9.23 | 46.3 | 57.7 | 44.4 | 10 | −38.9 | 0.127 |
| 40° C. | −33.3 | 20.9 | 51.1 | 61.5 | 49.3 | 17.9 | −27.3 | 0.248 |
| 60° C. | −25.3 | 21.5 | 55.3 | 67.6 | 54.3 | 26.9 | −24.3 | 0.271 |
| 80° C. | −32.1 | 21.8 | 48.3 | 59.8 | 50.8 | 23.5 | −21.1 | 0.256 |

EXAMPLE 8

Polymer films are prepared from a polymerisable mixture as described in example 6, but wherein compound (D1) is replaced by compound (D3) in the same amount (clearing point of the mixture is 90.0° C.).

(D3)

CH₂=CHCOO(CH₂)₆O—⟨⟩—COO—⟨⟩—COO—⟨⟩—Cl
                                    |
                                    Cl

K 78.0° C. N 126.0° C. I

Figure 5A:
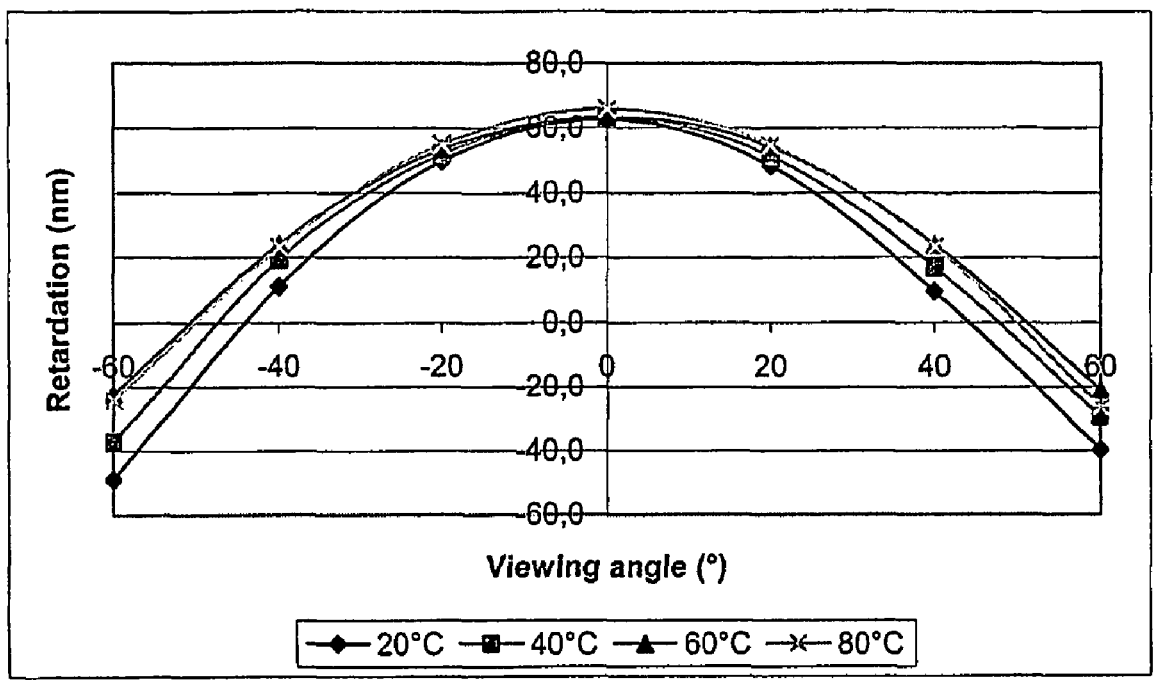
Figure 5B:
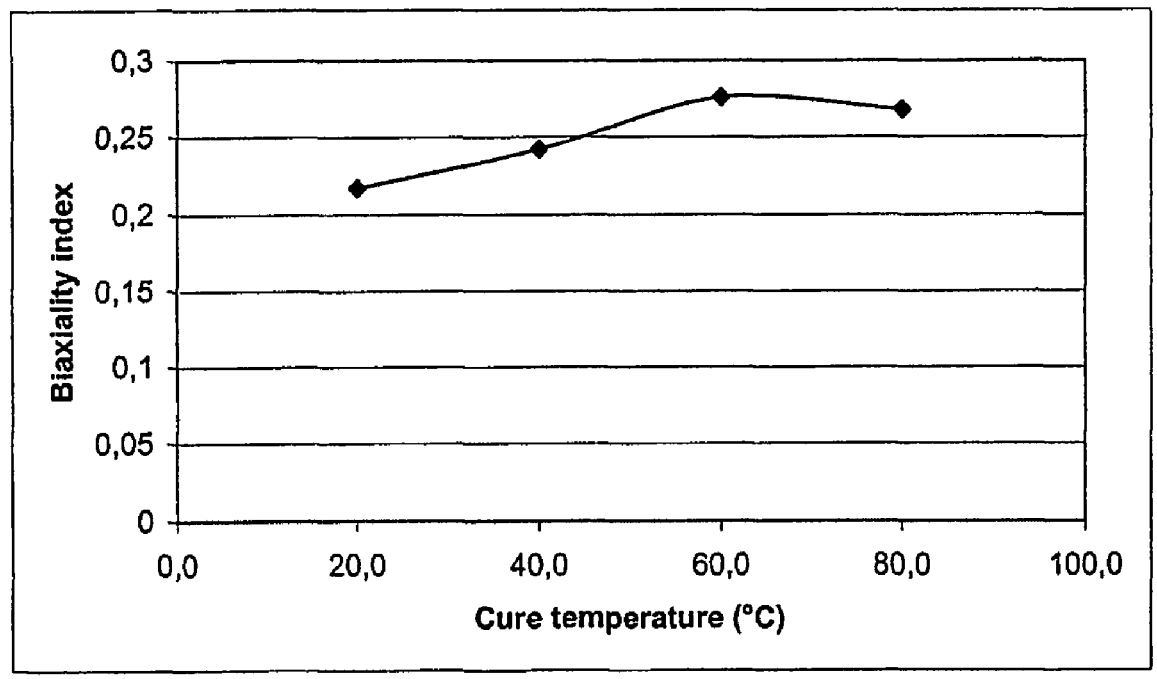

The retardation at different viewing angles and the biaxiality index BI of the polymer films are shown in table 5. The retardation profiles of the polymer films are shown in FIG. 5A, the biaxiality index versus cure temperature in FIG. 5B.

TABLE 5

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −48.9 | 11.1 | 49.7 | 62.5 | 48.2 | 9.56 | −39.8 | 0.217 |
| 40° C. | −37.3 | 19.3 | 51.7 | 63.3 | 51.3 | 16.9 | −29.5 | 0.242 |
| 60° C. | −22.3 | 24 | 53.4 | 63.4 | 54.1 | 23.8 | −21.1 | 0.276 |
| 80° C. | −24.2 | 23.1 | 54.8 | 65.9 | 54.5 | 23.2 | −26.4 | 0.268 |

EXAMPLE 9

Polymer films are prepared from a polymerisable mixture as described in example 6, but wherein compound (D1) was replaced by compound (D4) in the same amount (clearing point of the mixture is 86.0° C.).

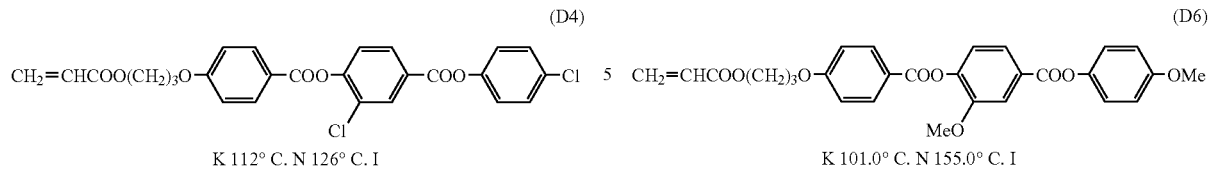

(D4)

K 112° C. N 126° C. I

Figure 6A:
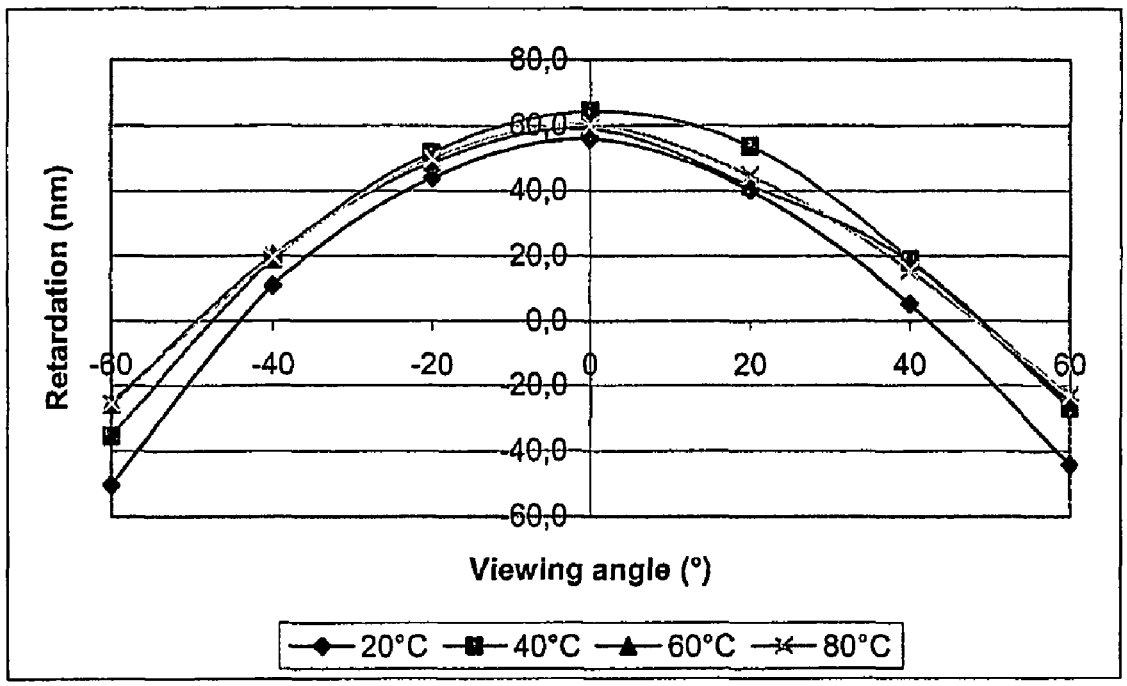
Figure 6B:
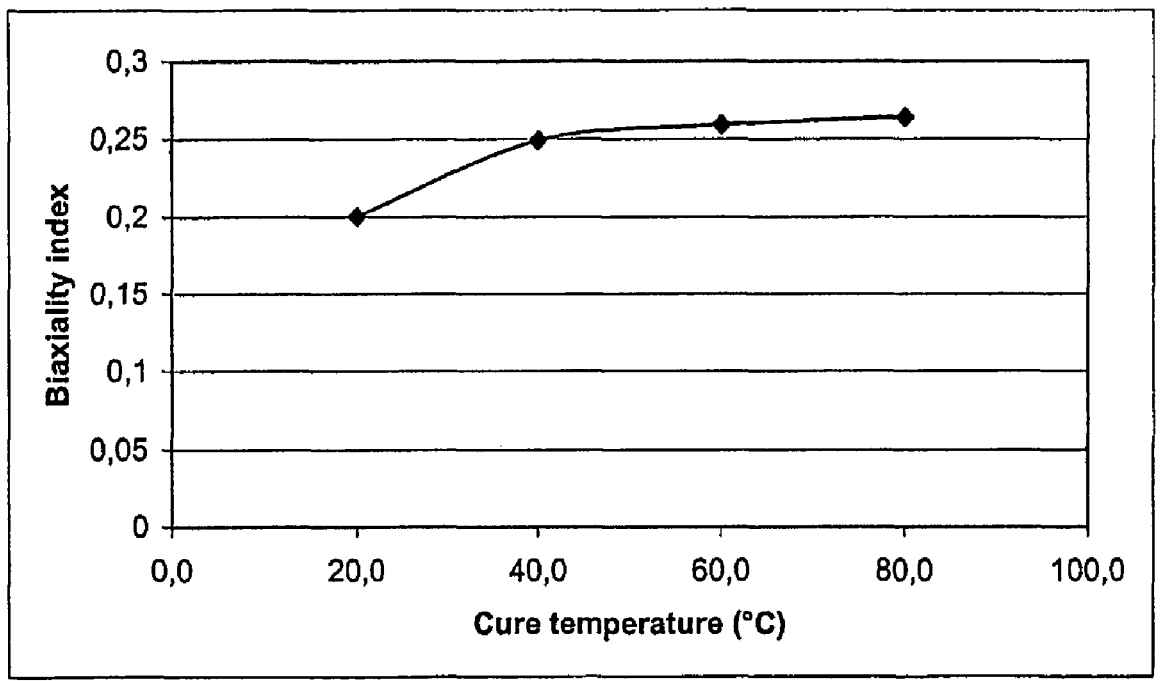

The retardation at different viewing angles and the biaxiality index BI of the polymer films are shown in table 6. The retardation profiles of the polymer films are shown in FIG. 6A, the biaxiality index versus cure temperature in FIG. 6B.

TABLE 6

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −50.5 | 10.8 | 43.9 | 55.9 | 40 | 5.17 | −44.2 | 0.200 |
| 40° C. | −35.6 | 18.8 | 51.7 | 64.2 | 53.7 | 18.9 | −27 | 0.249 |
| 60° C. | −25.7 | 20.3 | 48.5 | 59 | 41.5 | 18.3 | −25.3 | 0.259 |
| 80° C. | −25.5 | 19.6 | 49.7 | 60 | 44.5 | 15.5 | −23.1 | 0.264 |

EXAMPLE 10

Polymer films are prepared from a polymerisable mixture as described in example 6, but wherein compound (D1) was replaced by compound (D5) in the same amount (clearing point of the mixture is 80.0° C.).

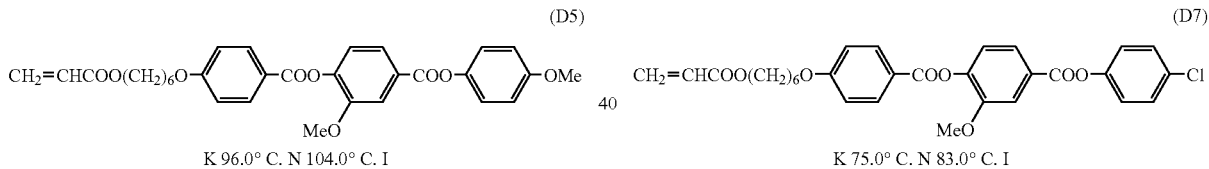

(D5)

K 96.0° C. N 104.0° C. I

Figure 7A:
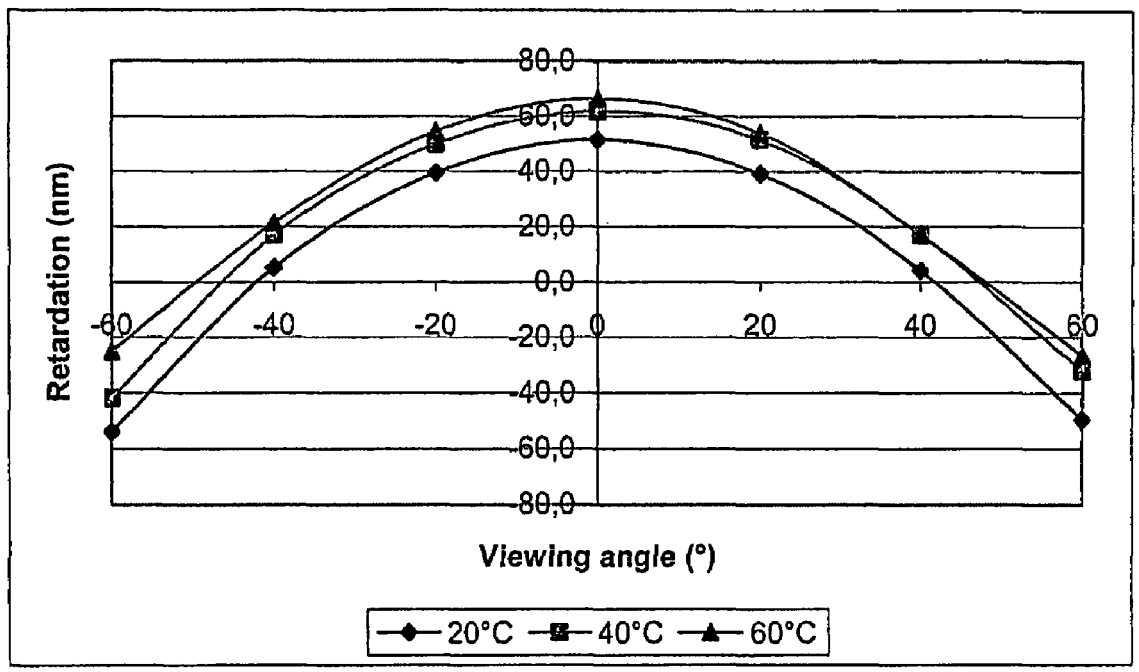
Figure 7B:
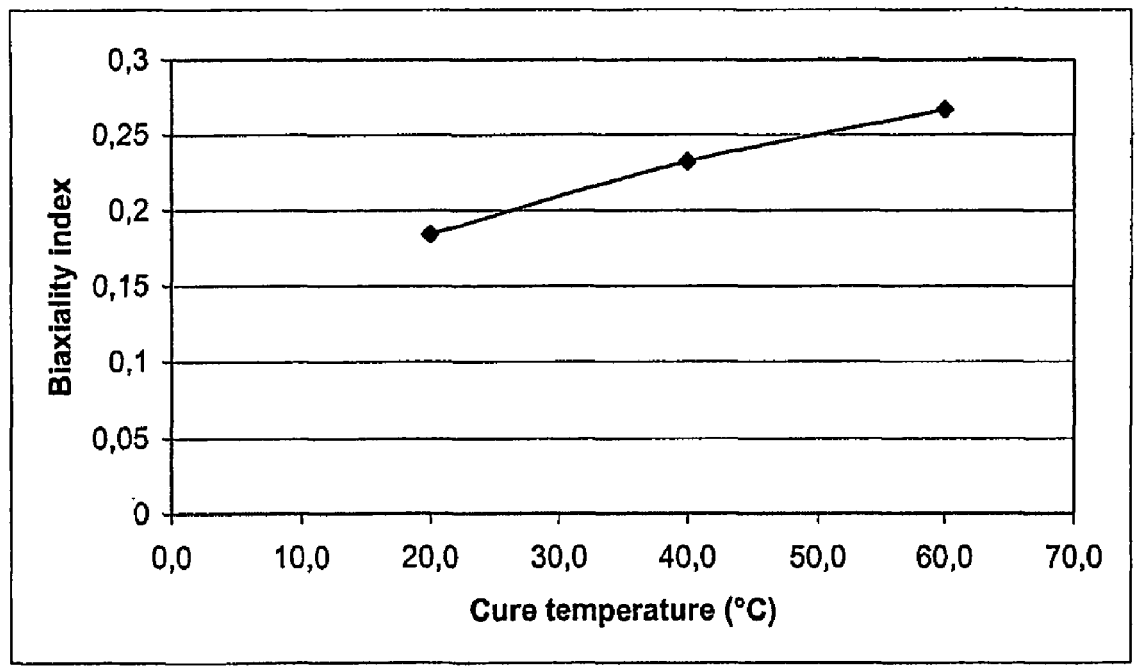

The retardation at different viewing angles and the biaxiality index BI of the polymer films are shown in table 7. The retardation profiles of the polymer films are shown in FIG. 7A, the biaxiality index versus cure temperature in FIG. 7B.

TABLE 7

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −54 | 5.2 | 39.3 | 51.5 | 39 | 4.2 | −50 | 0.184 |
| 40° C. | −42 | 17 | 49.8 | 61.8 | 51 | 17 | −32 | 0.232 |
| 60° C. | −25 | 21.3 | 54.4 | 66.4 | 54 | 17 | −27 | 0.267 |

EXAMPLE 11

Polymer films are prepared from a polymerisable mixture as described in example 6, but wherein compound (D1) is replaced by compound (D6) in the same amount (clearing point of the mixture is 84.0° C.).

(D6)

K 101.0° C. N 155.0° C. I

Figure 8A:
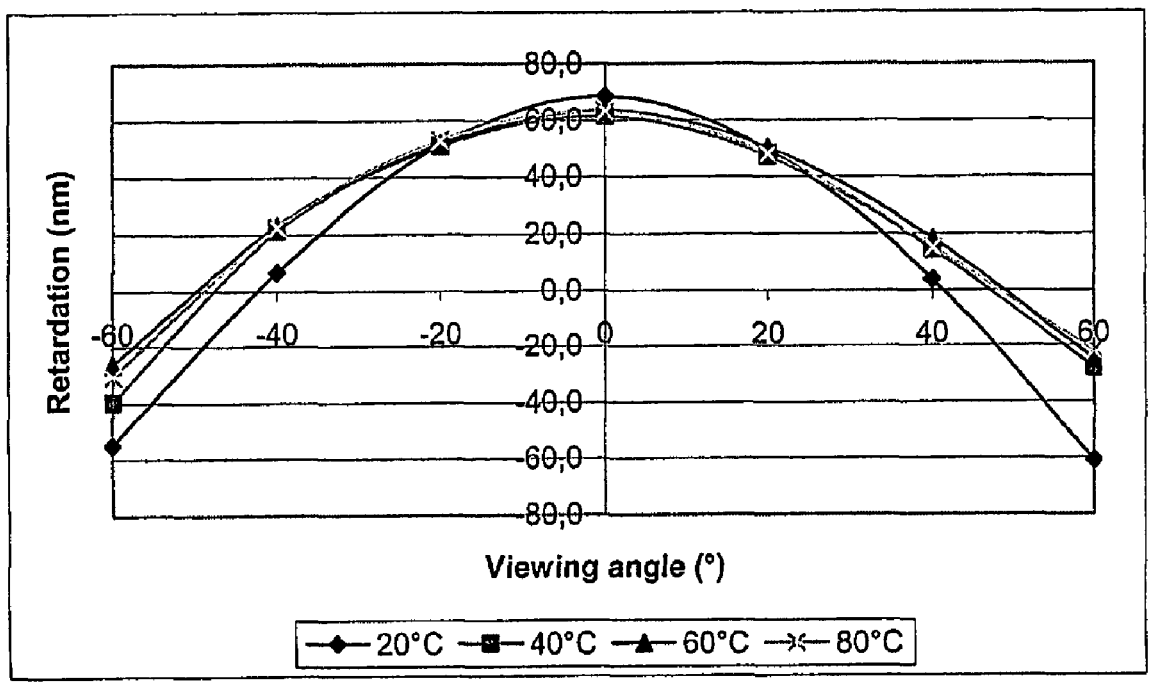
Figure 8B:
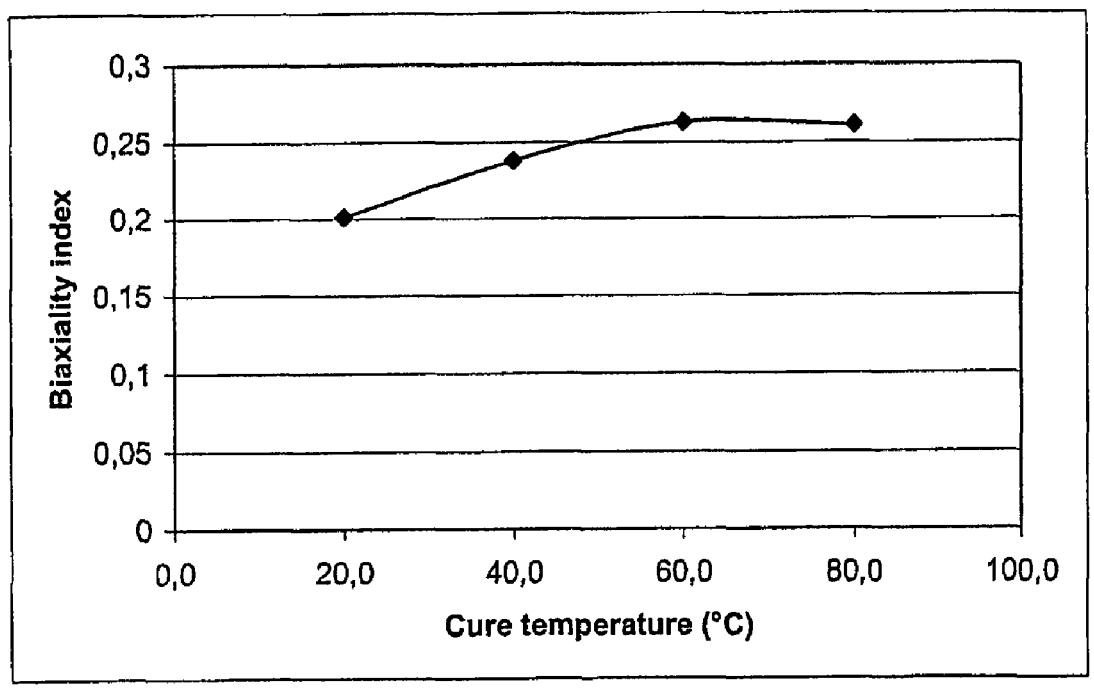

The retardation at different viewing angles and the biaxiality index BI of the polymer films are shown in table 8. The retardation profiles of the polymer films are shown in FIG. 8A, the biaxiality index versus cure temperature in FIG. 8B.

TABLE 8

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −55 | 6.67 | 51.4 | 68.5 | 49.4 | 3.81 | −60.8 | 0.201 |
| 40° C. | −39.8 | 21.3 | 50.8 | 61.4 | 47.1 | 14.4 | −28.1 | 0.238 |
| 60° C. | −26.5 | 23.1 | 51.7 | 63.4 | 50.2 | 18.1 | −25 | 0.263 |
| 80° C. | −30.9 | 22.5 | 52.9 | 63.1 | 47.9 | 14.9 | −22 | 0.261 |

EXAMPLE 12

Polymer films are prepared from a polymerisable mixture as described in example 6, but wherein compound (D1) is replaced by compound (D7) in the same amount (clearing point of the mixture is 76.0° C.).

(D7)

K 75.0° C. N 83.0° C. I

Figure 9A:
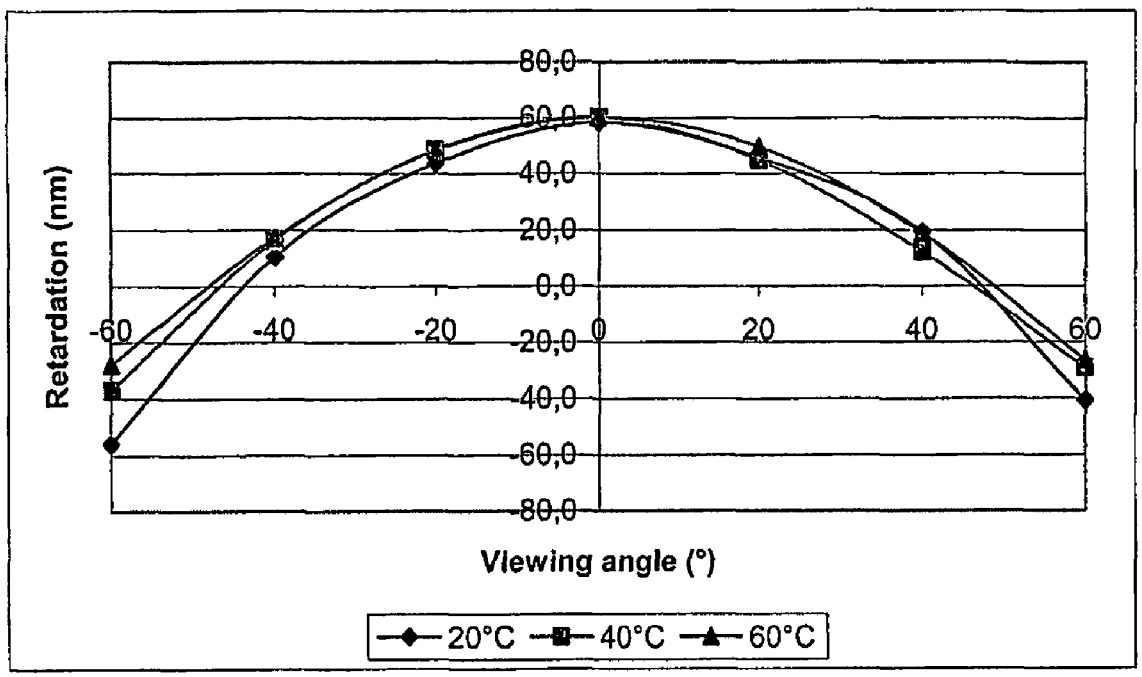
Figure 9B:
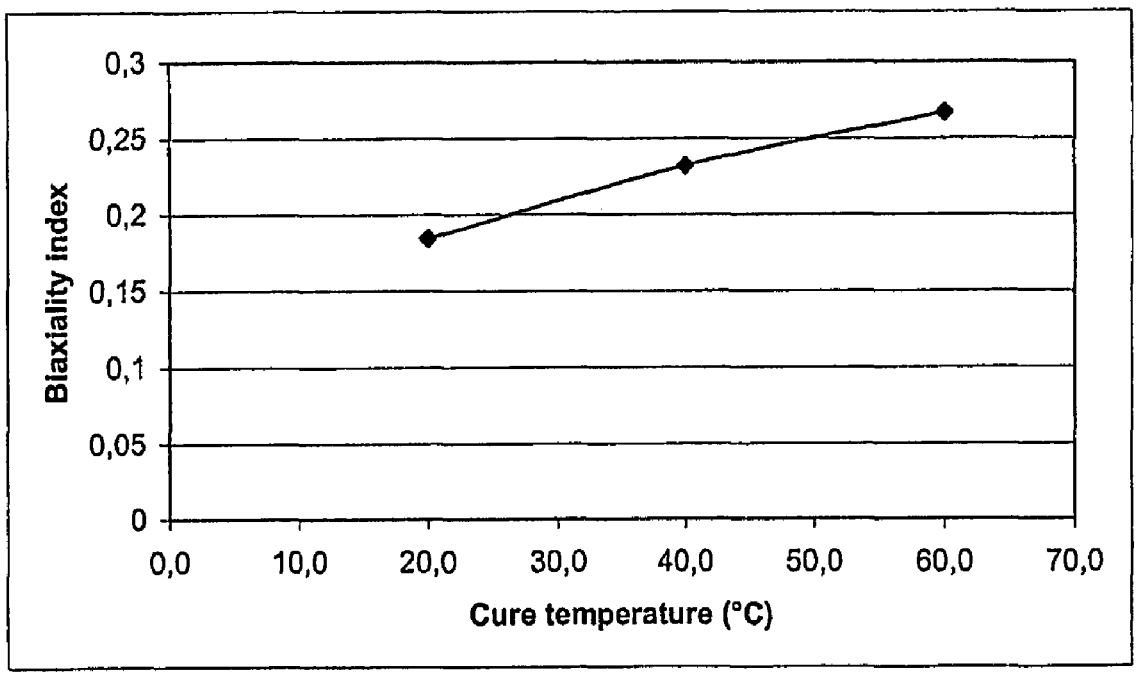

The retardation at different viewing angles and the biaxiality index BI of the polymer films are shown in table 9. The retardation profiles of the polymer films are shown in FIG. 9A, the biaxiality index versus cure temperature in FIG. 9B.

TABLE 9

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −56 | 10 | 43.6 | 58.2 | 46 | 19 | −41 | 0.202 |
| 40° C. | −37 | 16 | 48.6 | 60.2 | 45 | 12 | −29 | 0.239 |
| 60° C. | −28 | 17 | 48.3 | 60.1 | 49 | 19 | −26 | 0.256 |

EXAMPLE 13

Polymer films are prepared from a polymerisable mixture as described in example 6, but wherein compound (D1) is replaced by compound (D8) in the same amount (clearing point of the mixture is 73.0° C.).

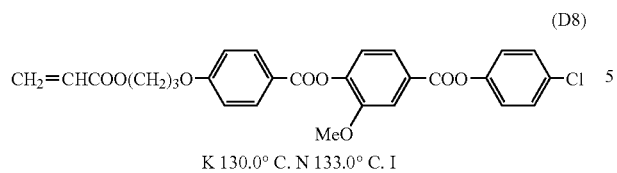

(D8)

K 130.0° C. N 133.0° C. I

Figure 10A:
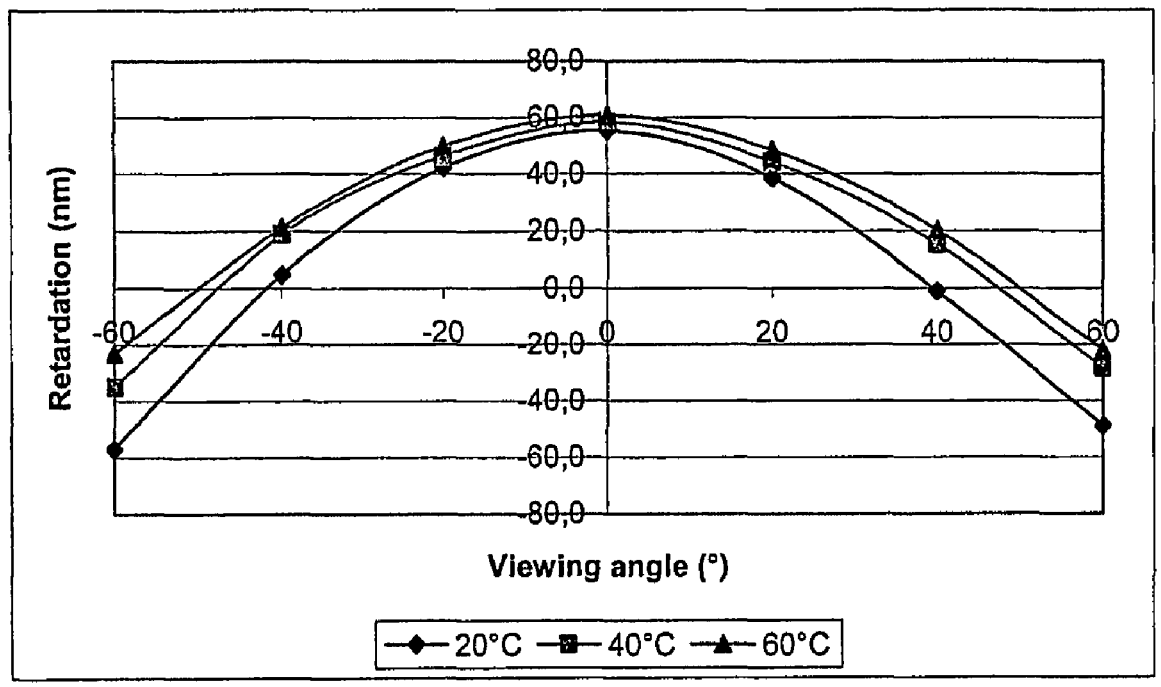
Figure 10B:
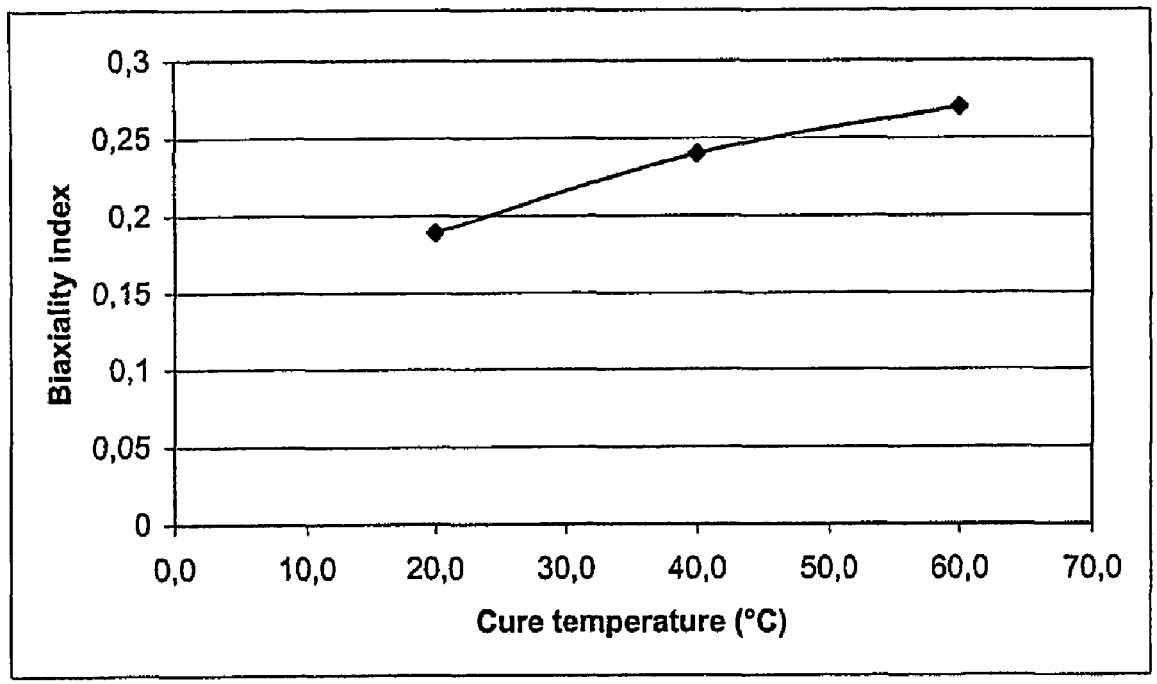

The retardation at different viewing angles and the biaxiality index BI of the polymer films are shown in table 10. The retardation profiles of the polymer films are shown in FIG. 10A, the biaxiality index versus cure temperature in FIG. 10B.

TABLE 10

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −57 | 4.68 | 42.3 | 55.2 | 38.5 | −1.2 | −49.1 | 0.189 |
| 40° C. | −35.1 | 18.8 | 46.4 | 58.3 | 44.3 | 15.3 | −28.5 | 0.240 |
| 60° C. | −23.2 | 21.2 | 49.9 | 60.8 | 48.5 | 20.2 | −22 | 0.270 |

EXAMPLE 14

Polymer films are prepared from a polymerisable mixture as described in example 6, but wherein compound (E2) is replaced by compound (E3) in the same amount (clearing point of the mixture is 92.4° C.).

Figure 11A:
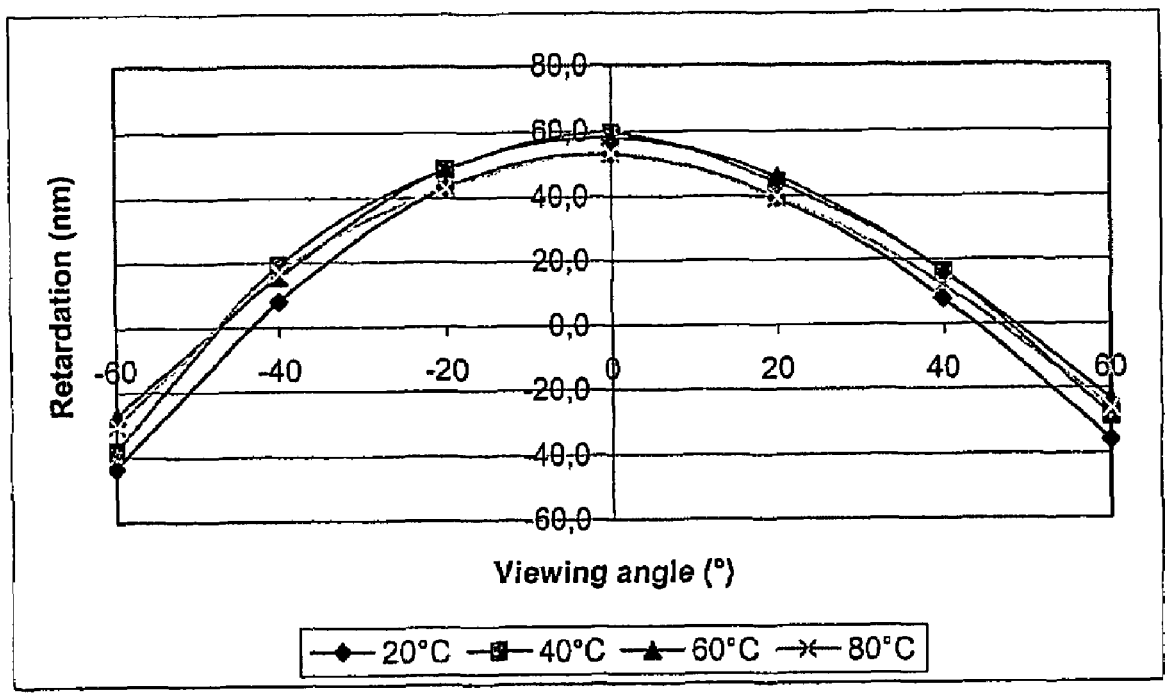
Figure 11B:
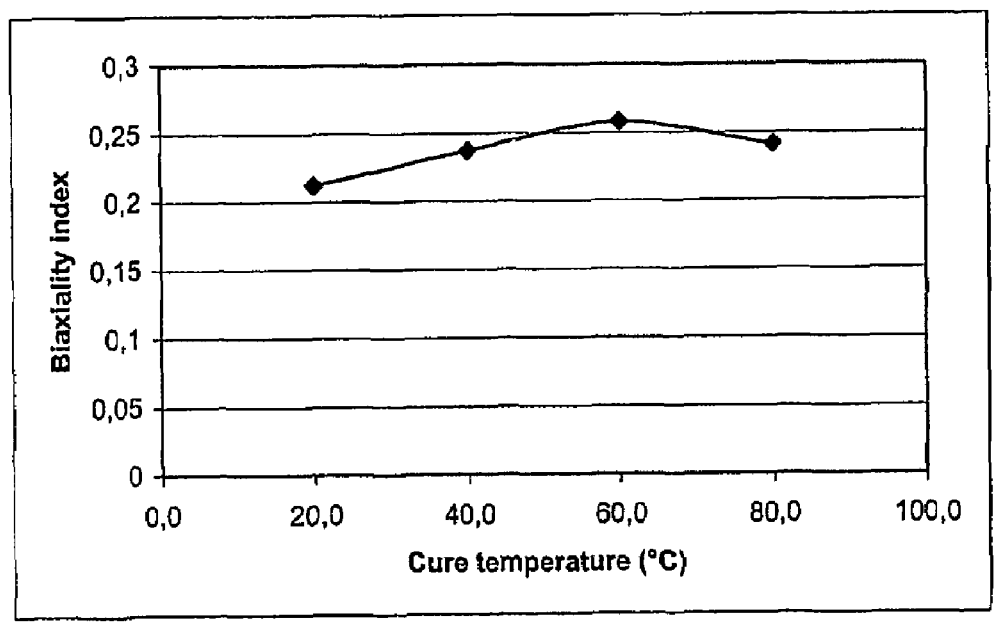

The retardation at different viewing angles and the biaxiality index BI of the polymer films are shown in table 11. The retardation profiles of the polymer films are shown in FIG. 11A, the biaxiality index versus cure temperature in FIG. 11B.

TABLE 11

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −43.4 | 7.83 | 43.1 | 53.1 | 39.3 | 7.79 | −35.9 | 0.212 |
| 40° C. | −38.1 | 19.1 | 48.8 | 59.4 | 44.2 | 16.2 | −28.7 | 0.237 |
| 60° C. | −27.4 | 15.5 | 48.8 | 58.2 | 46 | 16.3 | −23.5 | 0.258 |
| 80° C. | −30.6 | 16.8 | 43 | 53.2 | 39.5 | 12 | −26.3 | 0.241 |

EXAMPLE 15

Polymer films are prepared from a polymerisable mixture as described in example 6, but wherein compound (D1) is replaced by compound (D2) and compound (E2) is replaced by compound (E3) in the same amount (clearing point of the mixture is 100.2° C.).

Figure 12A:
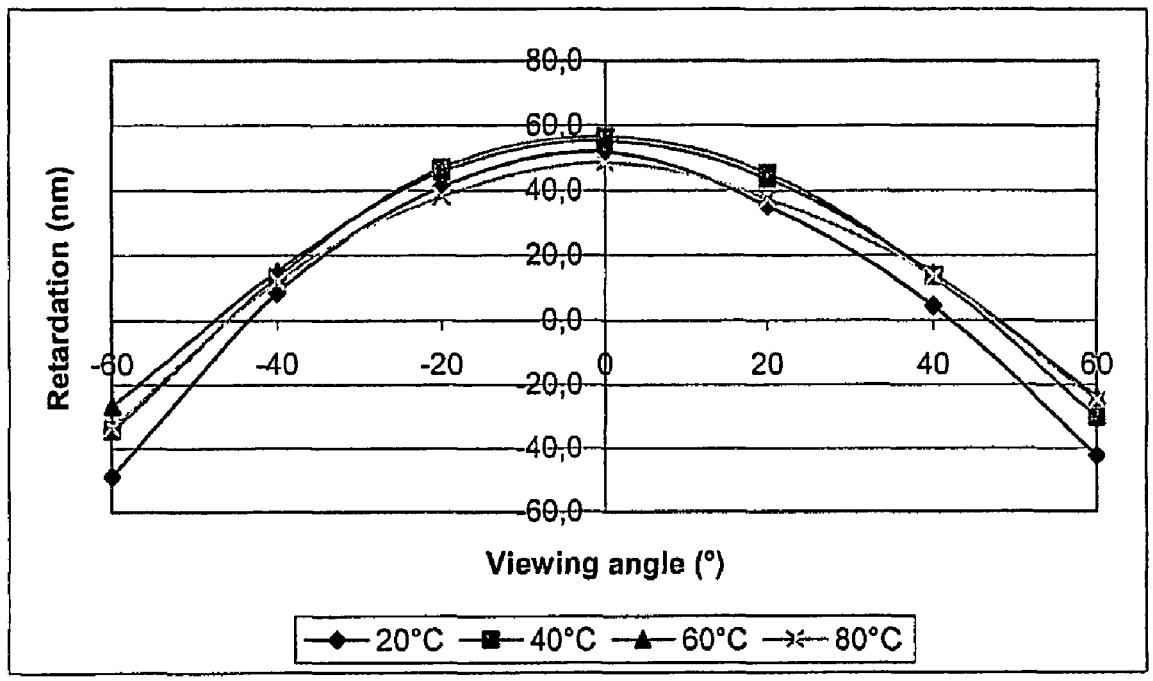
Figure 12B:
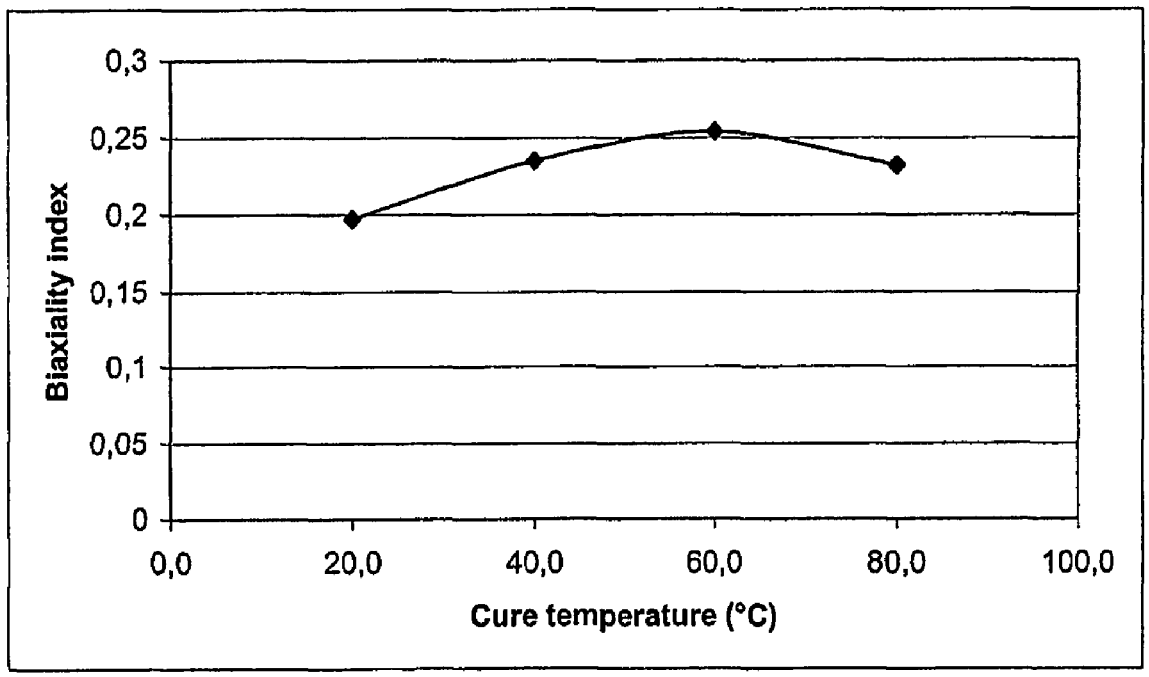

The retardation at different viewing angles and the biaxiality index BI of the polymer films are shown in table 12. The retardation profiles of the polymer films are shown in FIG. 12A, the biaxiality index versus cure temperature in FIG. 12B.

TABLE 12

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −49 | 8.37 | 41.1 | 51.9 | 35.2 | 4.42 | −42.4 | 0.197 |
| 40° C. | −34.5 | 13.2 | 46.9 | 56.5 | 45.4 | 13.7 | −30.4 | 0.235 |
| 60° C. | −26.7 | 15.1 | 45.8 | 55.4 | 43.7 | 14.3 | −24 | 0.254 |
| 80° C. | −33.4 | 12 | 38 | 48.5 | 37.5 | 13.6 | −24.8 | 0.232 |

EXAMPLE 16

The following polymerisable mixture is prepared

| | |
|---|---|
| Compound (A1) | 20.00% |
| Compound (B1) | 17.12% |
| Compound (B2) | 4.28% |
| Compound (D1) | 44.42% |
| Compound (C3) | 9.60% |
| Compound (E2) | 4.00% |
| FC171 ® (surfactant) | 0.50% |
| Irganox ® | 0.08% |

The mixture has a cholesteric phase and a clearing point of 101.0° C.

Polymer films are prepared from this polymerisable mixture as described in example 6.

Figure 13A:
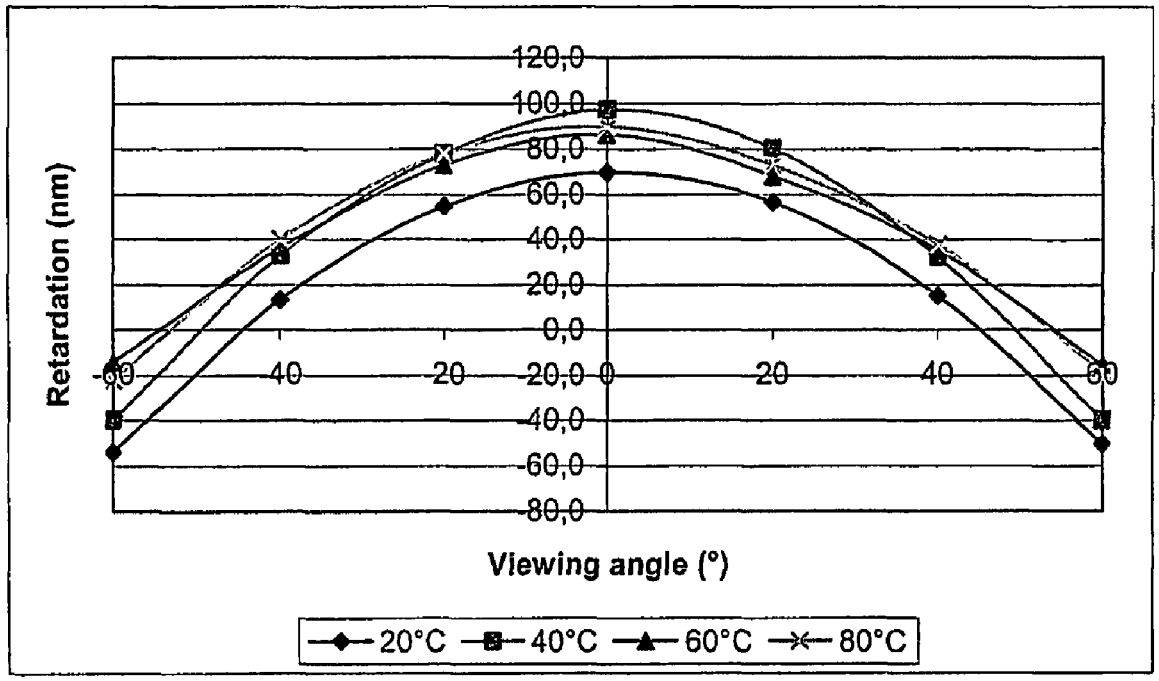
Figure 13B:
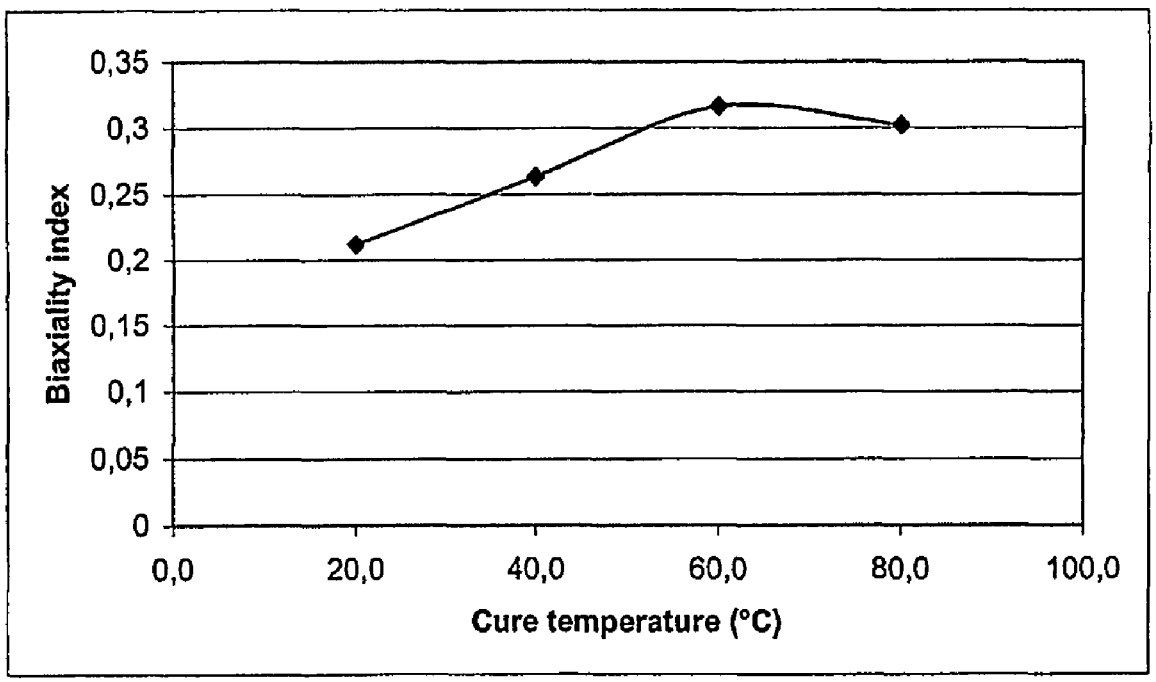

The retardation at different viewing angles and the biaxiality index BI of the polymer films are shown in table 15. The retardation profiles of the polymer films are shown in FIG. 13A, the biaxiality index versus cure temperature in FIG. 13B.

TABLE 13

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −54 | 13.3 | 54.6 | 69.6 | 56.5 | 15.1 | −50.4 | 0.212 |
| 40° C. | −39.8 | 32.9 | 77.8 | 97.2 | 80.3 | 32.1 | −40.1 | 0.263 |
| 60° C. | −14.3 | 36.1 | 72.9 | 86.3 | 68.2 | 35.2 | −15.5 | 0.316 |
| 80° C. | −22.2 | 39.8 | 77.8 | 89.8 | 72.9 | 37.5 | −18.1 | 0.302 |

EXAMPLE 17

Polymer films are prepared from a polymerisable mixture as described in example 16, but wherein compound (D1) is replaced by compound (D2) in the same amount (clearing point of the mixture is 105.0° C.).

Figure 14A:
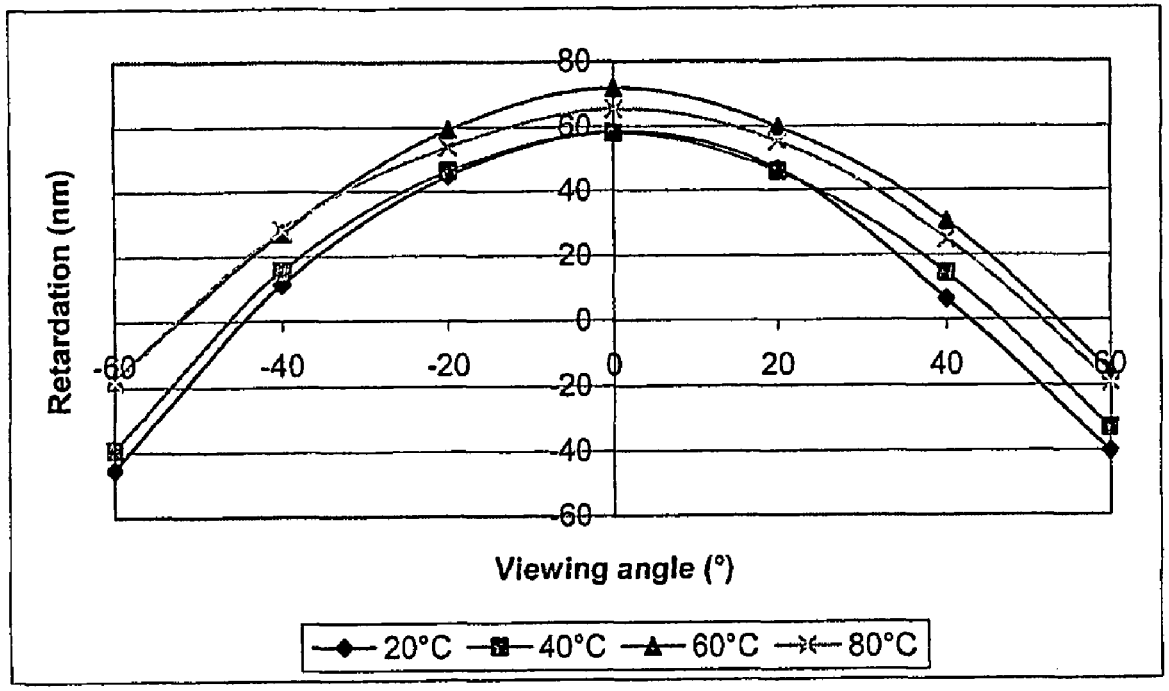
Figure 14B:
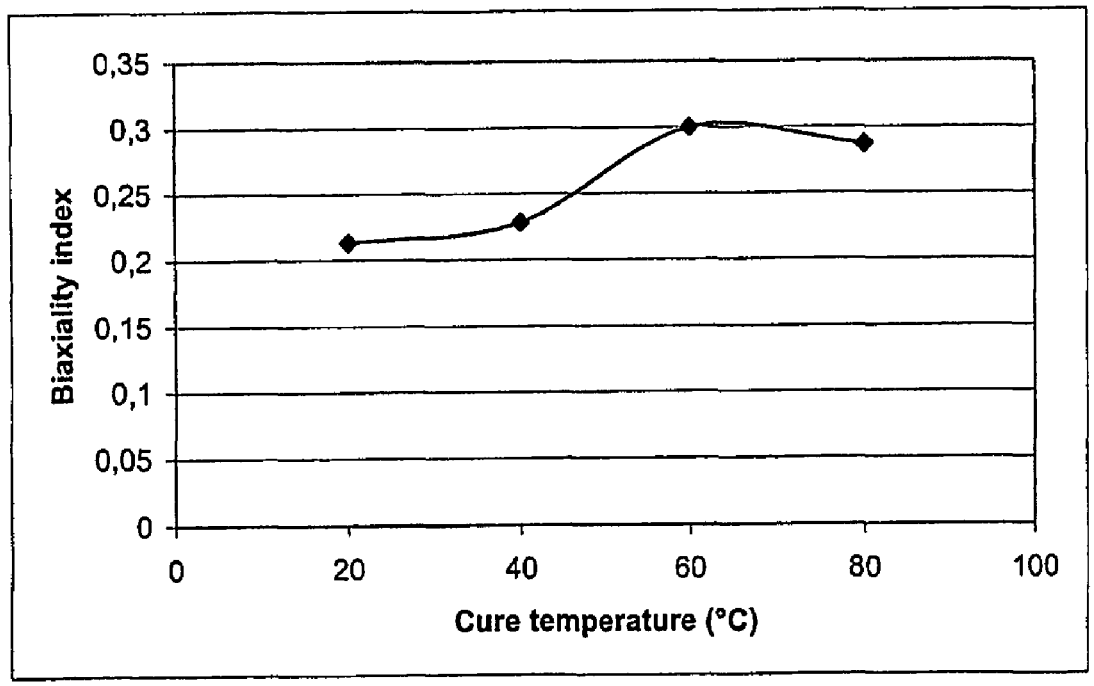

The retardation at different viewing angles and the biaxiality index BI of the polymer films are shown in table 14. The retardation profiles of the polymer films are shown in FIG. 14A, the biaxiality index versus cure temperature in FIG. 14B.

TABLE 14

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −45.5 | 11.3 | 44.8 | 58.3 | 46.6 | 6.38 | −40.2 | 0.213 |
| 40° C. | −39.3 | 15.6 | 46.2 | 58.1 | 45.9 | 14.4 | −33.1 | 0.228 |
| 60° C. | −17.8 | 27.2 | 59.3 | 72 | 59.9 | 30.5 | −15.8 | 0.300 |
| 80° C. | −18.6 | 28.1 | 53.9 | 65.4 | 55.3 | 25 | −19.2 | 0.287 |

EXAMPLE 18

Polymer films are prepared from a polymerisable mixture as described in example 16, but wherein compound (C3) is replaced by compound (C4) in the same amount (clearing point of the mixture is 102.0° C.).

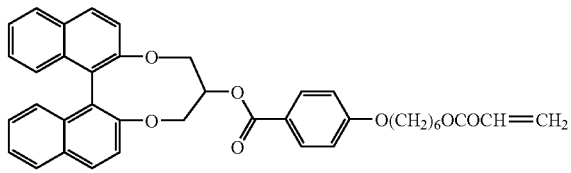

(C4)

Figure 15A:
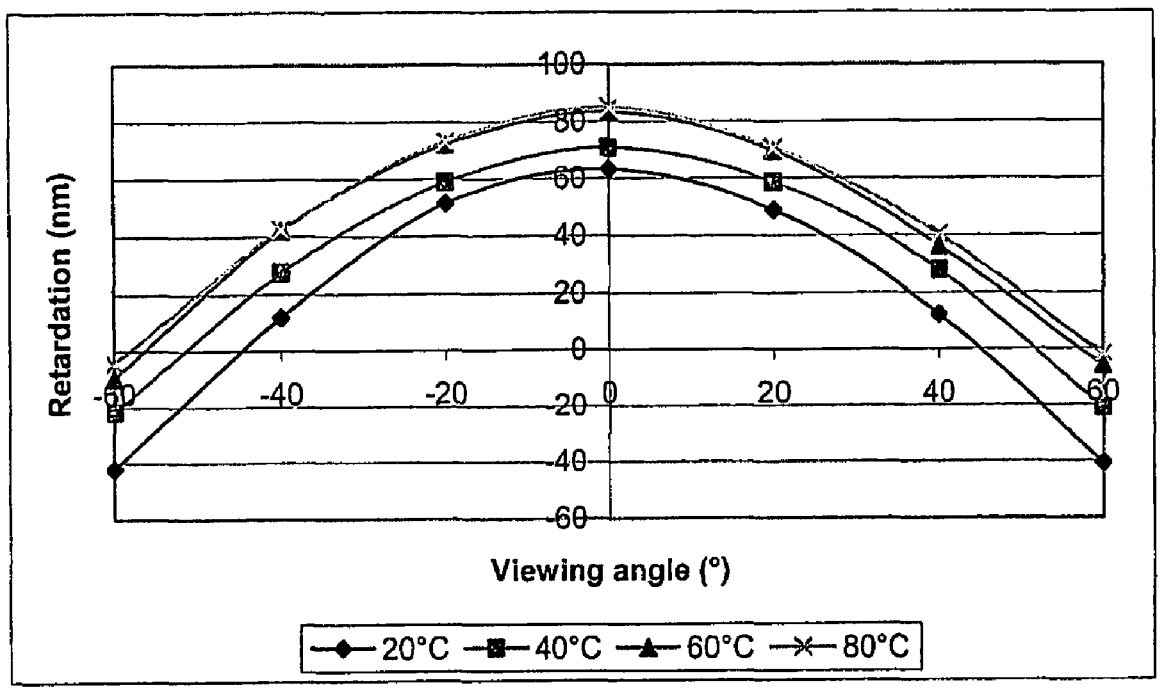
Figure 15B:
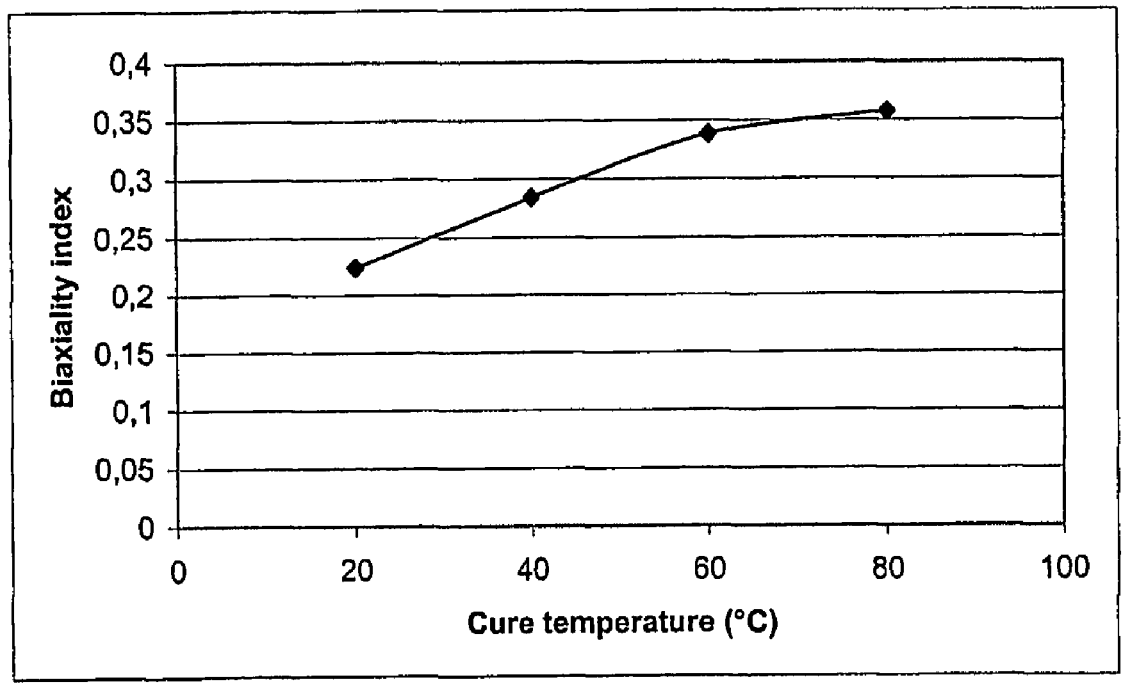

The retardation at different viewing angles and the biaxiality index BI of the polymer films are shown in table 15. The retardation profiles of the polymer films are shown in FIG. 15A, the biaxiality index versus cure temperature in FIG. 15B.

TABLE 15

Retardation (nm) for polymer films cured at different temperatures measured at different viewing angles

| Curing Temp. | Viewing Angle | | | | | | | BI |
|---|---|---|---|---|---|---|---|---|
| | −60° | −40° | −20° | 0° | 20° | 40° | 60° | |
| 20° C. | −42.1 | 11.9 | 51.5 | 63.1 | 48.8 | 12.2 | −40.7 | 0.224 |
| 40° C. | −21.7 | 27.4 | 58.9 | 70.8 | 58.5 | 27.7 | −21.1 | 0.284 |
| 60° C. | −9.72 | 42.1 | 72.2 | 83.2 | 69.5 | 36.2 | −6.07 | 0.338 |
| 80° C. | −4.54 | 42.4 | 73.1 | 84.7 | 70.3 | 40.2 | −2 | 0.357 |

EXAMPLE 19

The following polymerisable mixture is prepared

| Compound (A1) | 19.60% |
|---|---|
| Compound (B1) | 21.40% |
| Compound (a) | 11.20% |
| Compound (b) | 33.62% |
| Compound (C2) | 9.60% |
| Compound (E1) | 4.00% |
| FC171 ® | 0.50% |
| Irganox 1076 ® | 0.08% |

A polymer film is prepared from this mixture as described in example 1 (annealing temperature 61° C., cured at room temperature).

The retardation at different viewing angles and the biaxiality index BI of the polymer film are shown in table 16.

TABLE 16

Retardation (nm) for polymer film of example 19 measured at different viewing angles

| Sample | Viewing Angle | | | | | | | BI |
|---|---|---|---|---|---|---|---|---|
| | −60° | −40° | −20° | 0° | 20° | 40° | 60° | |
| Ex. 19 | −45.2 | 4.9 | 37.4 | 47.0 | 36.9 | 6.4 | −36.7 | 0.198 |

EXAMPLE 20

The following polymerisable mixture is prepared

| Compound (A1) | 19.60% |
|---|---|
| Compound (B1) | 14.00% |
| Compound (a) | 11.20% |
| Compound (b) | 33.62% |
| Compound (C2) | 2.00% |
| Compound (C5) | 15.00% |
| Compound (E1) | 4.00% |
| FC171 ® | 0.50% |
| Irganox 1076 ® | 0.08% |

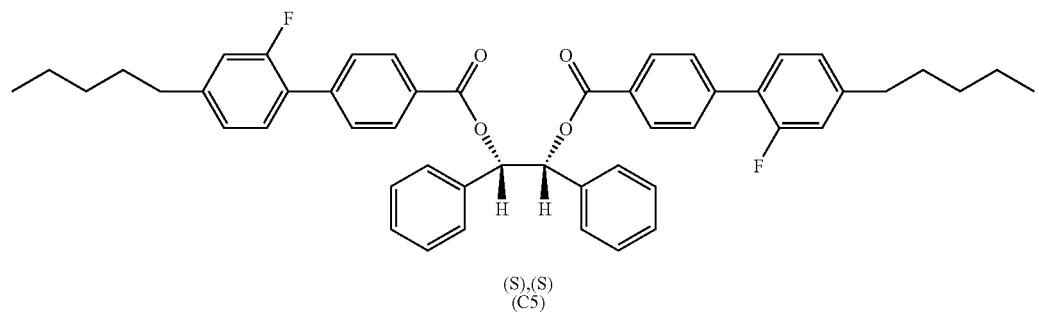

Chiral compound (C5) is disclosed in U.S. Pat. No. 6,511,719.

A polymer film is prepared from this mixture as described in example 1 (annealing temperature 43° C.).

The retardation at different viewing angles and the biaxiality index BI of the polymer film are shown in table 17.

TABLE 17

Retardation (nm) for polymer film of example 20 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 20 | −34.0 | 2.7 | 27.2 | 36.3 | 27.8 | 4.2 | −26.9 | 0.201 |

EXAMPLE 21

The following polymerisable mixture is prepared

| Compound (A1) | 19.60% |
| Compound (B1) | 15.36% |
| Compound (B2) | 3.84% |
| Compound (a) | 11.20% |
| Compound (b) | 33.62% |
| Compound (C2) | 2.00% |
| Paliocolor LC756 ® | 9.80% |
| Compound (E1) | 4.00% |

| FC171 ® | 0.50% |
| Irganox 1076 ® | 0.08% |

A polymer film is prepared from this mixture as described in example 1 (annealing temperature 57° C.).

The retardation at different viewing angles and the biaxiality index BI of the polymer film are shown in table 18.

TABLE 18

Retardation (nm) for polymer film of example 21 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 21 | −39.9 | 6.0 | 37.9 | 48.6 | 38.8 | 7.1 | −32.4 | 0.212 |

EXAMPLE 22

Compounds (A2-A8) are prepared as described above in schemes 1 to 3

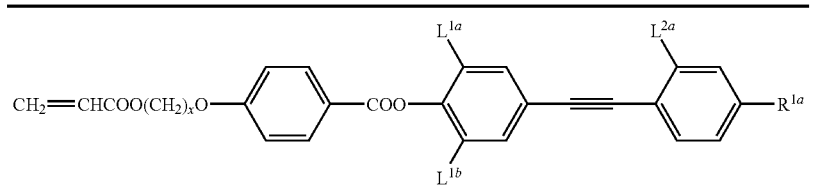

| Compound | $L^{1a}$ | $L^{1b}$ | $L^{2a}$ | $R^{1a}$ | X | phase transitions |
|---|---|---|---|---|---|---|
| (A2) | Cl | H | H | $OCH_3$ | 3 | K 111.4° C. N 172.3° C. I |
| (A3) | $CH_3$ | H | H | $OCH_3$ | 6 | K 80.8° C. N 157.5° C. I |
| (A4) | $CH_3$ | $CH_3$ | H | $OCH_3$ | 3 | K 131.2° C. N 137.8° C. I |
| (A5) | $CH_3$ | H | H | $OCH_3$ | 3 | K 98.6° C. N 179.6° C. I |
| (A6) | H | H | $CH_3$ | $CH_3$ | 3 | K 92.6° C. N 166.2° C. I |
| (A7) | $CH_3$ | H | H | $C_2H_5$ | 3 | K 70.0° C. N 146.0° C. I |
| (A8) | H | H | $CH_3$ | $CH_3$ | 6 | K 107.8° C. N 150.0° C. I |

EXAMPLE 23

The following polymerisable cholesteric LC mixture is prepared

| | |
|---|---|
| Compound (A2) | 19.60% |
| Compound (B1) | 19.20% |
| Compound (a) | 11.20% |
| Compound (b) | 33.62% |
| Compound (C2) | 2.00% |
| Paliocolor LC756 ® | 9.80% |
| Compound (E1) | 4.00% |
| FC171 ® | 0.50% |
| Irganox 1076 ® | 0.08% |

A polymer film is prepared from this mixture as described in example 1 (annealing temperature 58° C.).

The retardation at different viewing angles and the biaxiality index BI of the polymer film are shown in table 19.

TABLE 19

Retardation (nm) for polymer film of example 23 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 23 | −43.3 | 5.8 | 34.4 | 43.7 | 33.9 | 5.3 | −34.9 | 0.195 |

EXAMPLE 24-26

Polymer films are prepared from a polymerisable mixture as described in example 23, but wherein compound (A2) is replaced by compound (A3) (example 24), (A4) (example 25) and (A5) (example 26), respectively, in the same amount.

The retardation at different viewing angles and the biaxiality index BI of the polymer films are shown in table 20.

TABLE 20

Retardation (nm) for polymer films of example 24-26 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 24 | −38.0 | 5.8 | 33.9 | 43.7 | 34.0 | 3.7 | −36.5 | 0.200 |
| Ex. 25 | −40.3 | 3.5 | 28.4 | 37.4 | 27.9 | 2.1 | −34.9 | 0.185 |
| Ex. 26 | −43.5 | 3.6 | 33.3 | 44.7 | 35.1 | 5.2 | −34.8 | 0.197 |

EXAMPLE 27

The following polymerisable mixture is prepared

| | |
|---|---|
| Compound (A1) | 19.60% |
| Compound (B1) | 21.40% |
| Compound (a) | 11.20% |
| Compound (b) | 33.62% |
| Compound (C3) | 9.60% |
| Compound (E1) | 4.00% |
| FC171 ® | 0.50% |
| Irganox 1076 ® | 0.08% |

A polymer film is prepared from this mixture as described in example 1 (annealing temperature 45° C.).

The retardation at different viewing angles and the biaxiality index BI of the polymer film are shown in table 21.

TABLE 21

Retardation (nm) for polymer film of example 27 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 27 | −39.4 | 5.3 | 34.6 | 44.7 | 35.3 | 6.7 | −33.7 | 0.204 |

EXAMPLE 28

A polymer film is prepared from a polymerisable mixture as described in example 27, but wherein compound (A1) is replaced by compound (A5) in the same amount.

The retardation at different viewing angles and the biaxiality index BI of the polymer film is shown in table 22.

TABLE 22

Retardation (nm) for polymer film of example 28 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 27 | −43.5 | 3.6 | 33.3 | 44.7 | 35.1 | 5.2 | −34.8 | 0.197 |

EXAMPLE 29

The following polymerisable cholesteric LC mixture is prepared

| | |
|---|---|
| Compound (A1) | 20.00% |
| Compound (B1) | 52.00% |
| Compound (B2) | 13.50% |
| Paliocolor LC756 ® | 10.00% |
| Compound (E1) | 4.00% |
| FC171 ® | 0.50% |

A polymer film is prepared from this mixture as described in example 1 (annealing temperature 100° C.).

The retardation at different viewing angles and the biaxiality index BI of the polymer film are shown in table 23.

TABLE 23

Retardation (nm) for polymer film of example 29 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 29 | −55.8 | −0.5 | 39.7 | 48.3 | 34.9 | 0.8 | −52.2 | 0.175 |

EXAMPLE 30-35

Polymer films are prepared from a polymerisable mixture as described in example 29, but wherein compound (A1) is replaced by the following compounds in the same amount:

| | Example | | | | | |
|---|---|---|---|---|---|---|
| | 30 | 31 | 32 | 33 | 34 | 35 |
| Compound | A3 | A6 | A4 | A5 | A7 | A8 |
| annealing temperature | 100° C. | 85° C. | 70° C. | 100° C. | 100° C. | 100° C. |

The retardation at different viewing angles and the biaxiality index BI of the polymer films are shown in table 24.

TABLE 24

Retardation (nm) for polymer films of example 30-35 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 30 | −48.4 | −2.4 | 30.6 | 41.2 | 29.2 | −3.1 | −50.2 | 0.169 |
| Ex. 31 | −66.6 | −4.5 | 37.0 | 51.2 | 36.7 | −4.0 | −66.2 | 0.161 |
| Ex. 32 | −62.0 | −7.6 | 32.1 | 45.7 | 32.6 | −7.0 | −68.6 | 0.152 |
| Ex. 33 | −64.6 | 0.1 | 41.6 | 55.2 | 40.9 | −1.0 | −61.3 | 0.173 |
| Ex. 34 | −65.9 | −5.7 | 33.2 | 46.6 | 33.3 | −5.8 | −61.4 | 0.157 |
| Ex. 35 | −71.4 | −8.3 | 35.5 | 50.8 | 36.1 | −10.0 | −74.9 | 0.152 |

EXAMPLE 36

The following polymerisable cholesteric LC mixture is prepared

| | |
|---|---|
| Compound (A3) | 19.60% |
| Compound (B1) | 45.42% |
| Compound (a) | 5.00% |
| Compound (b) | 13.60% |
| Compound (C2) | 13.50% |
| Paliocolor LC756 ® | 10.00% |
| Compound (E1) | 4.00% |
| FC171 ® | 0.50% |
| Irganox 1076 | 0.08% |

A polymer film is prepared from this mixture as described in example 1 (annealing temperature 77° C.).

The retardation at different viewing angles and the biaxiality index BI of the polymer film are shown in table 25.

TABLE 25

Retardation (nm) for polymer film of example 36 measured at different viewing angles

| | Viewing Angle | | | | | | | |
|---|---|---|---|---|---|---|---|---|
| Sample | −60° | −40° | −20° | 0° | 20° | 40° | 60° | BI |
| Ex. 36 | −47.5 | −0.4 | 28.7 | 39.3 | 28.3 | −2.1 | −42.0 | 0.173 |

The invention claimed is:

1. Polymerisable LC material comprising the following components:
A) at least one compound having a high birefringence selected of formula I

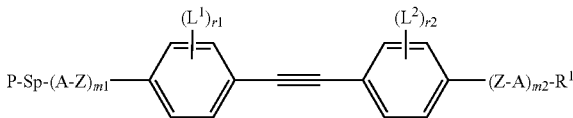

wherein
P is a polymerisable or reactive group,
Sp is a spacer group or a single bond,
A is in case of multiple occurrence independently of one another an aromatic or aliphatic 5- or 6-ring, or a group comprising two or three fused aromatic or aliphatic 5- or 6-rings, these rings optionally containing one or more hetero atoms selected from N, O and S, and optionally being substituted by one or more identical or different groups $L^1$,
Z is in case of multiple occurrence independently of one another —O—, —S—, —CO—, —COO—, —OCO—, —S—CO—, —CO—S—, —O—CO—O—, —CO—NR⁰—, —NR⁰—CO—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=CR⁰—, —CH=CH—, —CH=CF—, —CY¹=CY¹—, —C≡C—, —CH=CH—COO—, —OCO—CH=CH— or a single bond,
$R^0$, $R^{00}$ are independently of each other H or alkyl with 1 to 12 C-atoms,
$Y^1$, $Y^2$ are independently of each other H, F, Cl or CN,
m1, m2 are independently of each other 0, 1 or 2, with m1+m2 ≦ 3,
$L^1$, $L^2$ are independently of each other F, Cl, Br, I, CN, NO₂, P-Sp- or alkyl, alkoxy, alkylcarbonyl, alkoxycarbonyl, alkylcarbonlyoxy or alkoxycarbonyloxy with 1 to 12 C atoms, wherein one or more H atoms are optionally replaced by F or Cl,
r1, r2 are independently of each other 0, 1, 2, 3 or 4,
$R^1$ is H, halogen, CN, NO₂, NCS, SF₅, P-Sp- or straight chain or branched alkyl with 1 to 20 C-atoms that is optionally mono- or polysubstituted by F, Cl, Br, I or CN, and wherein one or more non-adjacent CH₂ groups are optionally replaced, in each case independently from one another, by —O—, —S—, —NR⁰—, —SiR⁰R⁰⁰—, —CO—, —COO—, —OCO—, —OCO—O—, —NR⁰—CO—, —CO—NR⁰—, —NR⁰—CO—NR⁰—, —S—CO—, —CO—S—, —CY¹=CY²— or —C≡C— in such a manner that O and/or S atoms are not linked directly to one another,
wherein at least one compound of formula Ia

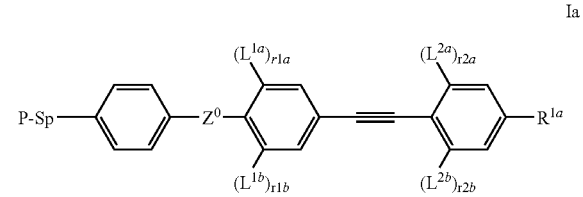

wherein P and Sp are as defined in formula I,
$Z^0$ is —COO—, —OCO— or a single bond, $L^{1a,1b,2a,2b}$ are independently of each other F, Cl, CN, $(O)_a C_b F_c H_{2b+1-c}$ or $COCH_3$, r1a, r1b, r2a, r2b are independently of each other 0 or 1, with at least one of r1a, r1b, r2a, r2b being 1, $R^{1a}$ is Cl or optionally mono- or polyfluorinated straight-chain or branched alkyl with 1 to 6 C-atoms wherein one or two non-adjacent CH$_2$-groups are optionally replaced by —O—, —S—, —CO—, —COO—, —OCO—, —OCO—O—, —S—CO— or —CO—S— in such a manner that O and/or S atoms are not linked directly to one another, a is 0 or 1,
b is 1 or 2,
c is 0, 1, 2, 3, 4 or 5, B) at least one polymerisable mesogenic compound having two or more polymerisable groups, C) at least one chiral compound having a high helical twisting power (HTP), D) optionally at least one monoreactive polymerisable compound having an enantiotropic nematic phase and a clearing point of 75° C. or higher, E) at least one dichroic photoinitiator.

2. Polymerisable LC material according to claim 1, characterized in that component A) comprises one or more compounds of formula I wherein m1 is 1, m2 is 0, A is 1,4-cyclohexylene or 1,4-phenylene that is optionally substituted with 1 to 4 groups $L^1$ and Z is —COO—, —OCO— or a single bond.

3. Polymerisable LC material according to claim 1, characterized in that component B) comprises one or more compounds of formula II

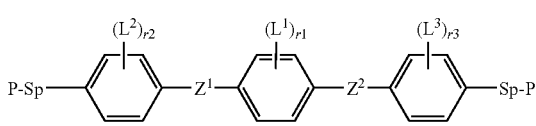

II wherein P, Sp, $L^1$, $L^2$, r1 and r2 have independently of each other the meanings of formula I, $Z^1$ and $Z^2$ have one of the meanings given for Z in formula I, $L^3$ has one of the meanings of $L^1$ and r3 has one of the meanings of r1.

4. Polymerisable LC material according to claim 1, characterized in that component C) comprises one or more compounds of formula III

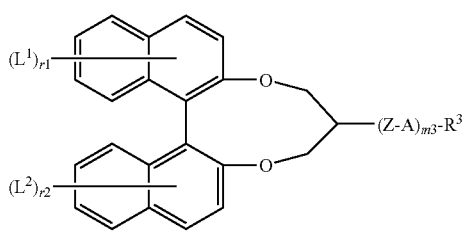

III wherein $R^3$ has one of the meanings of $R^1$ of formula I or is P-Sp, and P, Sp, Z, A, $L^1$, $L^2$, r1 and r2 have the meanings of formula I and m3 is 0, 1, 2 or 3.

5. Polymerisable LC material according to claim 1, characterized in that it comprises component D) comprising one or more compounds of formula IV

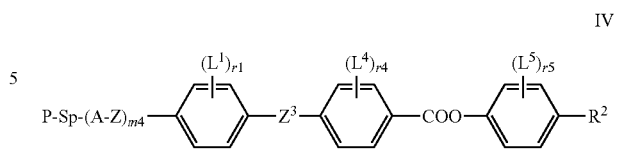

IV wherein P, Sp, A, Z, $L^1$, $L^2$, r1 and r2 have the meanings of formula I, m4 is 0, 1 or 2, $Z^3$ is —COO—, —OCO— or a single bond, $L^4$, $L^5$ have independently of each other one of the meanings of $L^1$ in formula I, r4, r5 are independently of each other 0, 1, 2, 3 or 4, with r4+r5>0, $R^2$ is H, halogen, CN, NO$_2$, NCS, SF$_5$ or straight chain or branched alkyl with 1 to 20 C-atoms that is optionally mono- or polysubstituted by F, Cl, Br, I or CN, and wherein one or more non-adjacent CH$_2$ groups are optionally replaced, in each case independently from one another, by —O—, —S—, NR$^o$—, —SiR$^o$R$^{oo}$—, —CO—, —COO—, —OCO—, —OCO—O—, —NR$^o$—CO—, —CO—NR$^o$—, —NR$^o$—CO—NR$^o$—, —S—CO—, —CO—S—, —CY$^1$=CY$^2$— or —C≡C— in such a manner that O and/or S atoms are not linked directly to one another.

6. Polymerisable LG material according to claim 1, characterized in that component E) comprises one or more compounds of formula V

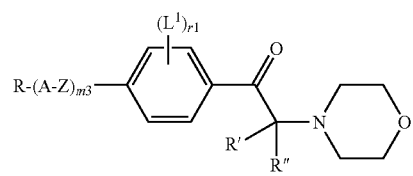

V wherein A, Z, $L^1$ and r1 are as defined in formula I, m3 is 0, 1, 2, or 3, and R, R' and R" have one of the meanings of $R^1$ in formula I.

7. Polymerisable LC material according to claim 1, characterized in that it comprises
one or more compounds of the following formula

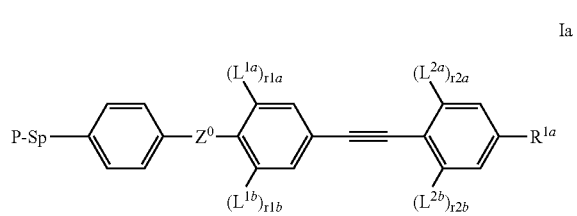

Ia wherein P and Sp are as defined in formula I, $Z^0$ is —COO—, —OCO— or a single bond, $L^{1a,1b,2a,2b}$ are independently of each other F, Cl, CN, $(O)_a C_b F_c H_{2b+1-c}$ or $COCH_3$, r1a, r1b, r2a, r2b are independently of each other 0 or 1, $R^{1a}$ is Cl or optionally mono- or polyfluorinated straight-chain or branched alkyl with 1 to 6 C-atoms wherein one or two non-adjacent CH$_2$— groups are optionally replaced by —O—, —S—, —CO—, —COO—, —OCO—, —OCO—O—, —S—CO— or —CO—S— in such a manner that O and/or S atoms are not linked directly in one another, a is 0 or 1,
b is 1 or 2,
c is 0, 1, 2, 3, 4 or 5,
one or more compounds of formula II

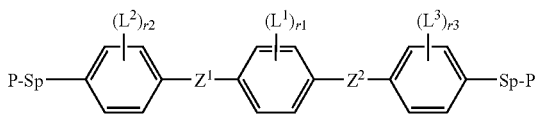

II wherein P, Sp, and $L^2$ have independently of each other the meanings of formula I, $L^3$ is F, Cl, Br, I, CN, $NO_2$, P-Sp- or alkyl, alkoxy, alkylcarbonyl, alkoxycarbonyl, alkylcarbonlyoxy or alkoxycarbonyloxy with 1 to 12 C atoms, wherein one or more H atoms are optionally replaced by F or Cl, $Z^1$ and $Z^2$ are —COO— or —OCO—, r2 and r3 are 0, r1 is 0, 1 or 2, and $L^1$ is F, Cl, $CH_3$, $C_2H_5$, $OCH_3$ or $COCH_3$, one or more compounds of the following formula

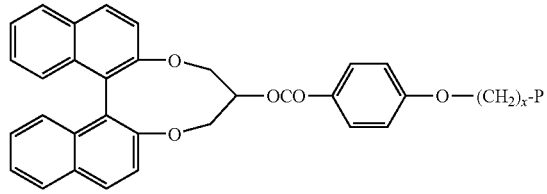

IIIa wherein x is an integer from 1 to 12 and P is as defined in formula I, one or more compounds of the following formula

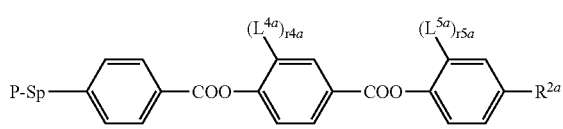

IVa wherein P and Sp are as defined in formula I,
$L^{4a,5a}$ are independently of each other F, Cl, $CH_3$, $C_2H_5$, $OCH_3$ or $COCH_3$,
r4a, r5a are 0 or 1, with r4a+r5a>0,
$R^{2a}$ is Cl or optionally mono- or polyfluorinated straight-chain or branched alkyl with 1 to 12 C-atoms, wherein one or two non-adjacent $CH_2$—groups are optionally replaced by —O—, —S—, —CO—, —COO—, —OCO—, —OCO—O—, —S—CO— or —CO—S— in such a manner that O and/or S atoms are not linked directly to one another, one or more compounds of the following formula

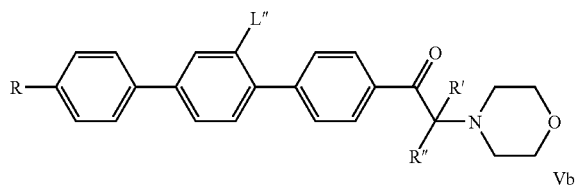

Va

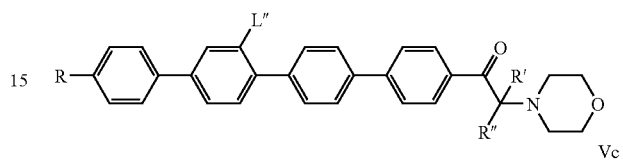

Vb

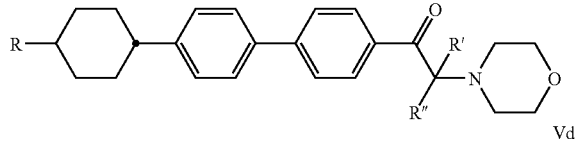

Vc

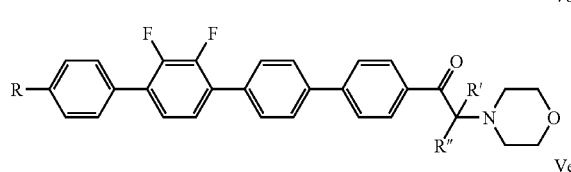

Vd

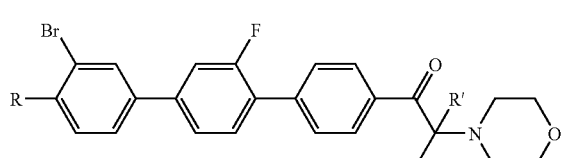

Ve

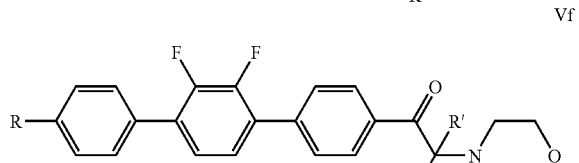

Vf

Vg

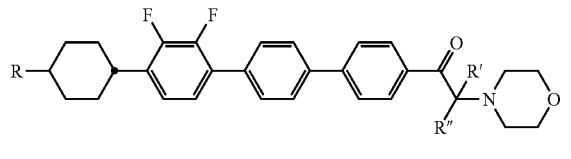

wherein L" is H or F, R is alkyl or alkoxy with 1 to 12 C-atoms, R' and R" are selected from alkyl or alkoxy with 1 to 6 C-atoms.

8. Polymerisable LC material according to claim 1, characterized in that it further comprises one or more of the following components F) one or more surfactants,
G) one or more non-mesogenic compounds having one, two or more polymerisable groups,
H) one or more chain transfer agents,
I) one or more dyes having an absorption maximum at a wavelength used to initiate photopolymerisation of the material.

9. Polymerisable LC material according to claim 1, characterized in that it comprises
   A) 5 to 60% of one or more compounds of formula I,
   B) 5 to 80% of one or more mesogenic compounds having two or more polymerisable groups,
   C) 0.1 to 20% of one or more chiral compounds,
   D) 0 to 70% of one or more compounds of formula IV

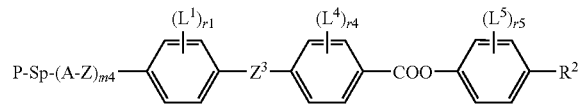

wherein P, Sp, A, Z, $L^1$, $L^2$, r1 and r2 have the meanings of formula I, m4 is 0, 1 or 2, $Z^3$ is —COO—, —OCO— or a single bond, $L^4$, $L^5$ have independently of each other one of the meanings of $L^1$ in formula I, r4, r5 are independently of each other 0, 1, 2, 3 or 4, with r4+r5>0, $R^2$ is H, halogen, CN, $NO_2$, NCS, $SF_5$ or straight chain or branched alkyl with 1 to 20 C-atoms that is optionally mono- or polysubstituted by F, Cl, Br, I or CN, and wherein one or more non-adjacent $CH_2$ groups are optionally replaced in each case independently from one another, by —O—, —S—, —$NR^0$—, —$SiR^0R^{00}$—, —CO—, —COO—, —OCO—, —OCO—O—, —$NR^0$—CO—, —CO—$NR^0$—, —$NR^0$—CO—$NR^0$—, —S—CO—, —CO—S—, —$CY^1$=$CY^2$— or —C≡C— in such a manner that O and/or S atoms are not linked directly to one another.

E) 0.1 to 15% of one or more dichroic photoinitiators,
   F) 0 to 10% of one or more surfactants,
   G) 0 to 30% of one or more mono-, di- or multifunctional polymerisable non-mesogenic compounds,
   H) 0 to 15 % of one or more chain transfer agents,
   I) 0 to 10 % of one or more dyes having an absorption maximum at the wavelength used for polymerisation of the material.

10. Compounds of formula Ia

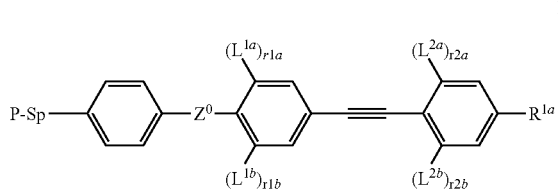

wherein
P is $CH_2$=$CW^1$—COO—, $CH_2$=$CW^1$—CO—,

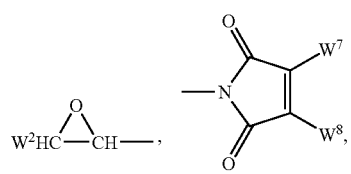

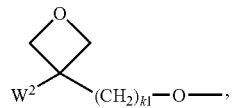

$CH_2$=$CW^2$—(O)$_{k1}$—,   $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HS—$CW^2W^3$—, H$W^2$N—, HO—$CW^2W^3$—NH—,   $CH_2$=$CW^1$—CO—NH—, $CH_2$=CH—(COO)$_{k1}$—Phe—(O)$_{k2}$—, $CH_2$CH—(CO)$_{k1}$—Phe—(O)$_{k2}$—, Phe—CH=CH—, HOOC—, OCN—, or $W^4W^5W^6$Si—, with $W^1$ being H, Cl, CN, $CF_3$, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted by one or more groups $L^{1b}$, $L^{1a}$, $L^{2a}$, or $L^{2b}$ and $k_1$ and $k_2$ being independently of each other 0 or 1, Sp is a spacer group or a single bond, $Z^0$ is —COO—, —OCO— or a single bond, $L^{1a,1b,2a,2b}$ are independently of each other F, Cl, CN, (O)$_a$C$_b$F$_c$H$_{2b+1-c}$ or COCH$_3$, r1a, r1b, r2a, r2b are independently of each other 0 or 1, with at least one of r1a, r1b, r2a, r2b being 1, $R^{1a}$ is Cl or optionally mono- or polyfluorinated straight-chain or branched alkyl with 1 to 6 C-atoms wherein one or two non-adjacent $CH_2$— groups are optionally replaced by —O—, —S—, —CO—, —COO—, —OCO—, —OCO—O—, —S—CO— or —CO—S— in such a manner that O and/or S atoms are not linked directly to one another, a is 0 or 1, b is 1 or 2, c is 0, 1, 2, 3, 4 or 5.

11. In an optical or electrooptical component or device, optical film, biaxial film, polariser, compensator, beam splitter, reflective film, alignment layer, colour filter, holographic element, hot stamping foil, coloured image, decorative or security marking, liquid crystal pigment, adhesive, synthetic resin with anisotropic mechanical properties, cosmetic, diagnostic device, nonlinear optic device, optical information storage device, or in LC media for an LC display device or containing polymerized liquid crystalline compounds, the improvement wherein the liquid crystalline compounds are of claim 10.

12. Process of preparing an optically biaxial film from a polymerisable LC material according to claim 1, by providing a layer of the polymerisable LC material on a substrate, aligning the material in its LC phase into planar orientation, photopolymerising the material by exposure to linear polarised light, and optionally removing the polymerised material from the substrate.

13. Process according to claim 12, characterized in that photopolymerisation is carried out at a temperature from 40° C. to 80° C.

14. Optically biaxial film obtainable from a polymerisable LC material according to claim 1.

15. Biaxial film according to claim 14, characterized in that $n_x$>$n_y$>$n_z$, wherein $n_x$ and $n_y$ are the principal refractive indices in orthogonal directions within the film plane and $n_z$ is the principal refractive index in a direction perpendicular to the film plane.

16. Biaxial film according to claim 14, characterized in that $R_0/R_{th} \geq 0.14$, wherein $R_0 = d \cdot (n_x - n_y)$ and $R_{th} = d \cdot [(n_x + n_y)/2 - n_z]$, wherein d is the film thickness.

17. A retardation or compensation film or alignment layer in optical devices or liquid crystal displays comprising a biaxial film according to claim 14.

18. Compensator comprising at least one film according to claim 14.

19. Liquid crystal display comprising at least one film or compensator according to claim 14.

20. Liquid crystal display comprising the following elements
    an LC cell formed by two plane parallel substrates at least one of which is transparent to incident light, an electrode layer provided on the inside of at least one of said two transparent substrates and optionally superposed with an alignment layer, and an LC medium which is present between the two substrates and is switchable between at least two different states by application of an electric field,
    a first linear polariser on one side of the LC cell,
    optionally a second linear polariser on the side of the LC cell opposite to that of said first linear polariser,
    at least one biaxial film or compensator according to claim 14 that is positioned between the two plane parallel substrates of said LC cell.

21. Liquid crystal display comprising
    an LC cell comprising the following elements
        a first and a second substrate plane parallel to each other, at least one of which is transparent to incident light,
        an array of nonlinear electric elements on one of said substrates which can be used to individually switch individual pixels of said LC cell, said elements being preferably active elements like transistors,
        a colour filter array provided on one of said substrates, preferably on the substrate opposite to that carrying the array of nonlinear elements, and having a pattern of different pixels transmitting one of the primary colours red, green and blue (R, G, B), said colour filter optionally being covered by a planarisation layer,
        a first electrode layer provided on the inside of said first substrate,
        optionally a second electrode layer provided on the inside of said second substrate,
        optionally first and second alignment layers provided on said first and second electrodes,
        an LC medium that is switchable between at least two different orientations by application of an electric field,
    a first (or 'front') linear polariser on the first side of the LC cell,
    optionally a second (or 'back') linear polariser on the second side of the LC cell, and
    at least one biaxial film or compensator according to claim 14 that is situated between the first and second substrate of the LC cell.

22. Liquid crystal display according to claim 19, characterized in that is a display of the TN (twisted nematic), OCB (optically compensated bend), pi-cell, VA (vertically aligned) or MVA (multi-domain vertically aligned) mode or a transflective display.

23. A compound according to claim 10, wherein $R^{1a}$ is Cl or optionally mono- or polyfluorinated alkyl, alkoxy or alkylsulfanyl with 1 to 6 C atoms.

24. A compound according to claim 10, wherein $L^{1a,1b,2a,2b}$ are each independently F, Cl, CN, $COCH_3$ or $OCH_3$.

25. A compound according to formula Ia

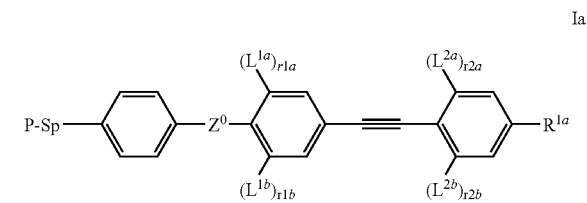

where P is $CH_2=CW^1—COO—$, $CH_2=CW^1—CO—$,

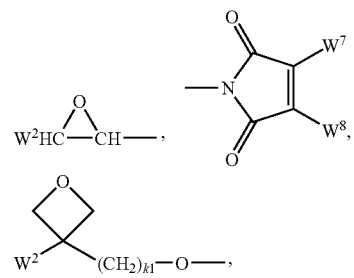

$CH_2=CW^2—(O)_{k1}—$, $CH_3—CH=CH—O—$, $(CH_2CH)_2$ $CH—OCO—$, $(CH_2=CH—CH_2)_2CH—OCO—$, $(CH_2=CH)_2CH—O—$, $(CH_2=CH—CH_2)_2N—$, $(CH_2=CH—CH_2)_2N—CO—$, $HS—CW^2W^3—$, $HW^2N—$, $HO—CW^2W^3—NH—$, $CH_2=CW^1—CO—NH—$, $CH_2=CH—(COO)_{k1}—Phe—(O)_{k2}—$, $CH_2CH—(CO)_{k1}—Phe—(O)_{k2}—$, $Phe—CH=CH—$, $HOOC—$, $OCN—$, or $W^4W^5W^6Si-$, with $W^1$ being H, Cl, CN, $CF_3$, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted by one or more groups $L^{1b}$, $L^{1a}$, $L^{2a}$, or $L^{2b}$ and $k_1$ and $k_2$ being independently of each other 0 or 1, Sp is a spacer group or a single bond, $Z^0$ is $—COO—$, $—OCO—$ or a single bond, $L^{1a,1b,2a,2b}$ are independently of each other F, Cl, CN, $(O)_aC_bF_cH_{2b+1-c}$ or $COCH_3$, r1a, r1b, r2a, r2b are independently of each other 0 or 1, with at least one of r1a, r1b, r2a, r2b being 1, $R^{1a}$ is Cl, mono- or polyfluorinated alkyl with 1 to 6 C-atoms, optionally mono- or polyfluorinated alkoxy with 1 to 6 C-atoms, or optionally mono- or polyfluorinated alkylsulfanyl with 1 to 6 C-atoms, a is 0 or 1, b is 1 or 2, and c is 0, 1, 2, 3, 4 or 5.

26. A compound according to claim 25, wherein $R^{1a}$ is Cl, $OCH_3$, $OC_2H_5$, $SCH_3$, $SC_2H_5$, $OCF_3$, $OCHF_2$, $OCH_2F$ or $OC_2F_5$.

27. A compound according to claim 26, wherein $L^{1a,1b,2a,2b}$ are independently of each other F, Cl, CN, $CH_3$ or $OCH_3$.

* * * * *

UNITED STATES PATENT AND TRADEMARK OFFICE
CERTIFICATE OF CORRECTION

PATENT NO. : 7,597,942 B2
APPLICATION NO. : 11/661832
DATED : October 6, 2009
INVENTOR(S) : May et al.

It is certified that error appears in the above-identified patent and that said Letters Patent is hereby corrected as shown below:

Column 44, line 29 reads "Polymerizable LG material according to claim 1, char-", should read -- Polymerizable LC material according to claim 1, char- --.

Column 49, line 11 reads "of different pixels tmnsmitting one of the primary", should read -- of different pixels transmitting one of the primary --.

Signed and Sealed this

Twenty-fourth Day of November, 2009

David J. Kappos
*Director of the United States Patent and Trademark Office*